United States Patent
Lingutla et al.

(10) Patent No.: US 11,662,797 B2
(45) Date of Patent: May 30, 2023

(54) TECHNIQUES FOR ADJUSTING COMPUTING DEVICE SLEEP STATES

(71) Applicant: Apple Inc., Cupertino, CA (US)

(72) Inventors: Varaprasad V. Lingutla, Fremont, CA (US); Kartik R. Venkatraman, Santa Clara, CA (US); Marc J. Krochmal, Santa Clara, CA (US)

(73) Assignee: Apple Inc.

( * ) Notice: Subject to any disclaimer, the term of this patent is extended or adjusted under 35 U.S.C. 154(b) by 0 days.

(21) Appl. No.: 17/651,532

(22) Filed: Feb. 17, 2022

(65) Prior Publication Data
US 2022/0171451 A1  Jun. 2, 2022

Related U.S. Application Data

(63) Continuation of application No. 15/996,372, filed on Jun. 1, 2018, now Pat. No. 11,269,393, which is a
(Continued)

(51) Int. Cl.
*G06F 1/3231* (2019.01)
*G06F 1/3206* (2019.01)
(Continued)

(52) U.S. Cl.
CPC .......... *G06F 1/3231* (2013.01); *G06F 1/3206* (2013.01); *G06F 1/3209* (2013.01); *G06F 1/3287* (2013.01)

(58) Field of Classification Search
CPC .... G06F 1/3209; G06F 1/3231; G06F 1/3287; G06F 1/329; G06F 1/3234; G06F 1/3246; G06F 1/3203
See application file for complete search history.

(56) References Cited

U.S. PATENT DOCUMENTS

| 6,563,427 B2 | 5/2003 | Bero et al. |
| 6,654,895 B1 | 11/2003 | Henkhaus et al. |

(Continued)

FOREIGN PATENT DOCUMENTS

WO  2010048099 A2  4/2010

OTHER PUBLICATIONS

International Patent Application No. PCT/US2018/034638— International Search Report Written Opinion dated Oct. 29, 2018.
(Continued)

*Primary Examiner* — Jaweed A Abbaszadeh
*Assistant Examiner* — Brian J Corcoran
(74) *Attorney, Agent, or Firm* — Dickinson Wright RLLP

(57) ABSTRACT

This application relates to techniques that adjust the sleep states of a computing device based on proximity detection and predicted user activity. Proximity detection procedures can be used to determine a proximity between the computing device and a remote computing device coupled to the user. Based on these proximity detection procedures, the computing device can either correspondingly increase or decrease the amount power supplied to the various components during either a low-power sleep state or a high-power sleep state. Additionally, historical user activity data gathered on the computing device can be used to predict when the user will likely use the computing device. Based on the gathered historical user activity, deep sleep signals and light sleep signals can be issued at a time when the computing device is placed within a sleep state which can cause it to enter either a low-power sleep state or a high-power sleep state.

20 Claims, 13 Drawing Sheets

Related U.S. Application Data continuation-in-part of application No. 15/720,783, filed on Sep. 29, 2017, now Pat. No. 10,802,568.

(60) Provisional application No. 62/514,743, filed on Jun. 2, 2017.

(51) Int. Cl.
*G06F 1/3209* (2019.01)
*G06F 1/3287* (2019.01)

(56) References Cited

U.S. PATENT DOCUMENTS

| | | |
|---|---|---|
| 6,775,784 B1 | 8/2004 | Park |
| 7,017,057 B2 | 3/2006 | Magee et al. |
| 7,069,462 B2 | 6/2006 | Owen et al. |
| 7,107,455 B1 | 9/2006 | Merkin |
| 7,430,675 B2 | 9/2008 | Lee |
| 8,762,756 B1 | 6/2014 | Moy |
| 8,935,547 B2 | 1/2015 | Theocharous et al. |
| 9,430,024 B2 | 8/2016 | Heo et al. |
| 2008/0126815 A1 | 5/2008 | Cantwell et al. |
| 2009/0092293 A1 | 4/2009 | Lin |
| 2010/0007801 A1 | 1/2010 | Cooper et al. |
| 2010/0115309 A1 | 5/2010 | Carvalho et al. |
| 2010/0235667 A1 | 9/2010 | Mucignat et al. |
| 2011/0126034 A1 | 5/2011 | Siegel et al. |
| 2011/0175626 A1 | 7/2011 | Lee et al. |
| 2012/0003932 A1 | 1/2012 | Zhodzishsky |
| 2013/0012123 A1 | 1/2013 | DeLuca |
| 2014/0136867 A1 | 5/2014 | Yamamoto |
| 2014/0215248 A1 | 7/2014 | Cheng et al. |
| 2014/0309996 A1* | 10/2014 | Zhang .................... G10L 21/16 704/246 |
| 2015/0095533 A1 | 4/2015 | Valavi et al. |
| 2015/0205335 A1 | 7/2015 | Teshome et al. |
| 2015/0277528 A1 | 10/2015 | Knight et al. |
| 2016/0124493 A1 | 5/2016 | Liao et al. |
| 2016/0360488 A1 | 12/2016 | Kapoor et al. |
| 2018/0348844 A1 | 12/2018 | Lingutla et al. |
| 2018/0348849 A1 | 12/2018 | Lingutla et al. |

OTHER PUBLICATIONS

Final Office Action, U.S. Appl. No. 15/996,372, dated Aug. 6, 2021 (14 pages).

\* cited by examiner

TECHNIQUES FOR ADJUSTING COMPUTING DEVICE SLEEP STATES

CROSS-REFERENCE TO RELATED APPLICATIONS

The present application is a continuation of U.S. patent application Ser. No. 15/996,372, entitled "TECHNIQUES FOR ADJUSTING COMPUTING DEVICE SLEEP STATES," filed Jun. 1, 2018, set to issue on Mar. 8, 2022 as U.S. Pat. No. 11,269,393, which is a continuation-in-part of U.S. patent application Ser. No. 15/720,783, entitled "TECHNIQUES FOR ADJUSTING COMPUTING DEVICE SLEEP STATES," filed Sep. 29, 2017, issued Oct. 13, 2020 as U.S. Pat. No. 10,802,568, which claims the benefit of U.S. Provisional Application No. 62/514,743, entitled "TECHNIQUES FOR ADJUSTING COMPUTING DEVICE SLEEP STATES," filed Jun. 2, 2017, the contents of which are incorporated herein by reference in their entirety for all purposes.

FIELD OF INVENTION

The described embodiments relate generally to sleep state adjustment procedures for computing devices. More particularly, the present embodiments relate to techniques that involve adjusting sleep states for a computing device based on a proximity of a remote device and/or learned user behavior.

BACKGROUND

In a given conventional computer system, the system can transition between a number of different sleep states based on a duration for which the system remains in a generalized sleep state. For example, as the sleep duration increases, the system can increasingly lower or switch off power to different internal components in an effort to promote energy efficiency. For instance, after a first period of sleep time elapses, one system component is powered off, after a second period of sleep time elapses, another system component is powered off, and so on.

Notably, the cost of implementing the foregoing energy saving measures can often result in the system requiring a considerable amount time to re-enter into a fully-functional/awake computing state. In particular, additional time costs can be involved in reanimating the different internal components when the system is abruptly required to reenter into an awake state (e.g., when a laptop lid is opened, when a power button is pressed, etc.). Consequently, this can be unpleasant for users as they are required to sit and wait for seemingly long periods of time for their systems to enter into an awake state after extended periods of disuse.

SUMMARY OF INVENTION

Accordingly, representative embodiments set forth herein disclose techniques for adjusting the sleep states of a computing device based on proximity detection and predicted user activity in a manner that allows the computing device to efficiently use power resources. In particular, the techniques involve (1) adjusting sleep states of a computing device based on a proximity of a remote computing device, and (2) adjusting sleep states based on historical user activity through the scheduling of deep and light sleep signals.

One embodiment sets forth a method for adjusting sleep states of a first computing device based on a proximity of a second computing device. In particular, the method involves, at the first computing device, a first step of detecting the proximity of the first computing device relative to the second computing device. Next, the method involves, provided the first computing device is operating within a high-power sleep state and is not proximate to the second computing device, the step of causing the first computing device to enter into a low-power sleep state relative to the high-power sleep state. Finally, the method involves the step of, provided the first computing device is operating within the low-power sleep state and is proximate to the second computing device, causing the first computing device to enter into the high-power sleep state.

One embodiment sets forth a method for adjusting sleep states based on historical user activity. In particular, the method involves a first step of gathering the historical user activity on the computing device when the computing device is in an awake state. Next, the method involves scheduling, based on the historical user activity, a deep sleep signal and a light sleep signal to occur when the computing device is within a sleep state, in which the deep sleep signal causes the computing device to enter into a low-power sleep state, and the light sleep signal causes the computing device to enter into a high-power sleep state. Finally, the method involves the step of issuing the deep sleep signal and the light sleep signal in accordance with the scheduling when the computing device is within the sleep state.

Another embodiment sets for a method for adjusting sleep states of a computing device. According to some embodiments, the method can be performed at the computing device, and include the steps of: (1) analyzing historical behavior associated with the computing device to identify at least one time period in which the computing device is not utilized, (2) scheduling, in accordance with the at least one time period, a first event and a second event to occur, wherein: (i) the first event causes the computing device to enter into a lowest-power sleep state in which the computing device ceases performing detections to identify whether the computing device should enter into a higher-power sleep state, and (ii) the second event causes the computing device to enter into the higher-power sleep state while operating in the lowest-power sleep state.

Yet another embodiment sets forth a method for managing a plurality of applications on a computing device in accordance with sleep states under which the computing device is operating. According to some embodiments, the method can be performed at the computing device, and include the steps of (1) in response to detecting that a first condition is satisfied: causing the computing device to transition from operating in a lowest-power sleep state to a higher-power sleep state, and (2) in response to detecting that a second condition is satisfied while operating in the higher-power sleep state: causing at least one application of the plurality of applications to carry out at least one respective action.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
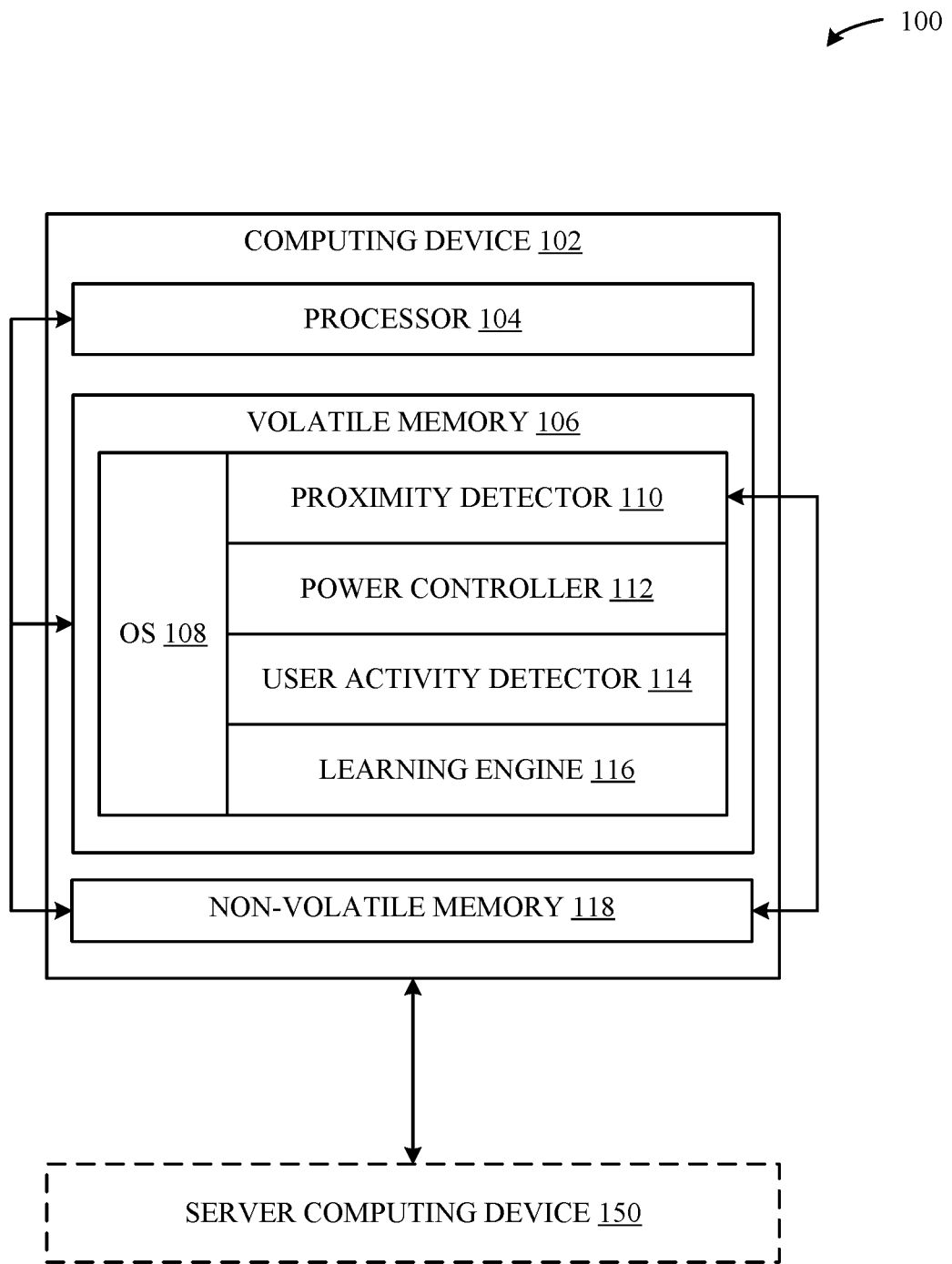
FIG. 1 illustrates an overview of a system that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

The embodiments described herein set forth techniques for adjusting sleep states of a computing device to reduce the amount of time it spends re-entering into a fully-functional/ awake computing state. Unnecessary startup delays are often caused due to the considerable amount of time the computing device spends powering on each of the various components of the computing device that were previously placed into sleep states. The embodiments described herein can avoid these delays by using proximity detection procedures to determine if a user is nearby and, thus, likely to use the computing device by detecting the presence of a remote computing device coupled to the user. The described embodiments can correspondingly increase power supplied to the various components during a low-power sleep state to place it in position for use in the likely event that the user uses the computing device again given the user's proximity to it.

Using proximity detection procedures, the embodiments can also determine if a user is not near the computing device based on a lack of proximity between the computing device and the remote computing device. In this fashion, the embodiments can also correspondingly decrease power supplied to the various components during a high-power sleep state to better conserve power resources given the unlikely event that the user will re-engage in its use based on the lack of proximity.

The embodiments described herein also use historical user activity data gathered on the computing device to predict when the user will likely use the computing device. Based on historical user activity data gathered over a period of time, the described embodiments can schedule the issuance of deep sleep signals and light sleep signals when the computing device is within a sleep state which can cause it to enter either a low-power sleep state or a high-power sleep state.

A more detailed description of the various techniques described herein, and the manner in which they can be implemented, is provided below in conjunction with FIGS. 1, 2A-2B, 3A-3D, and 4-7.

Figure 7:
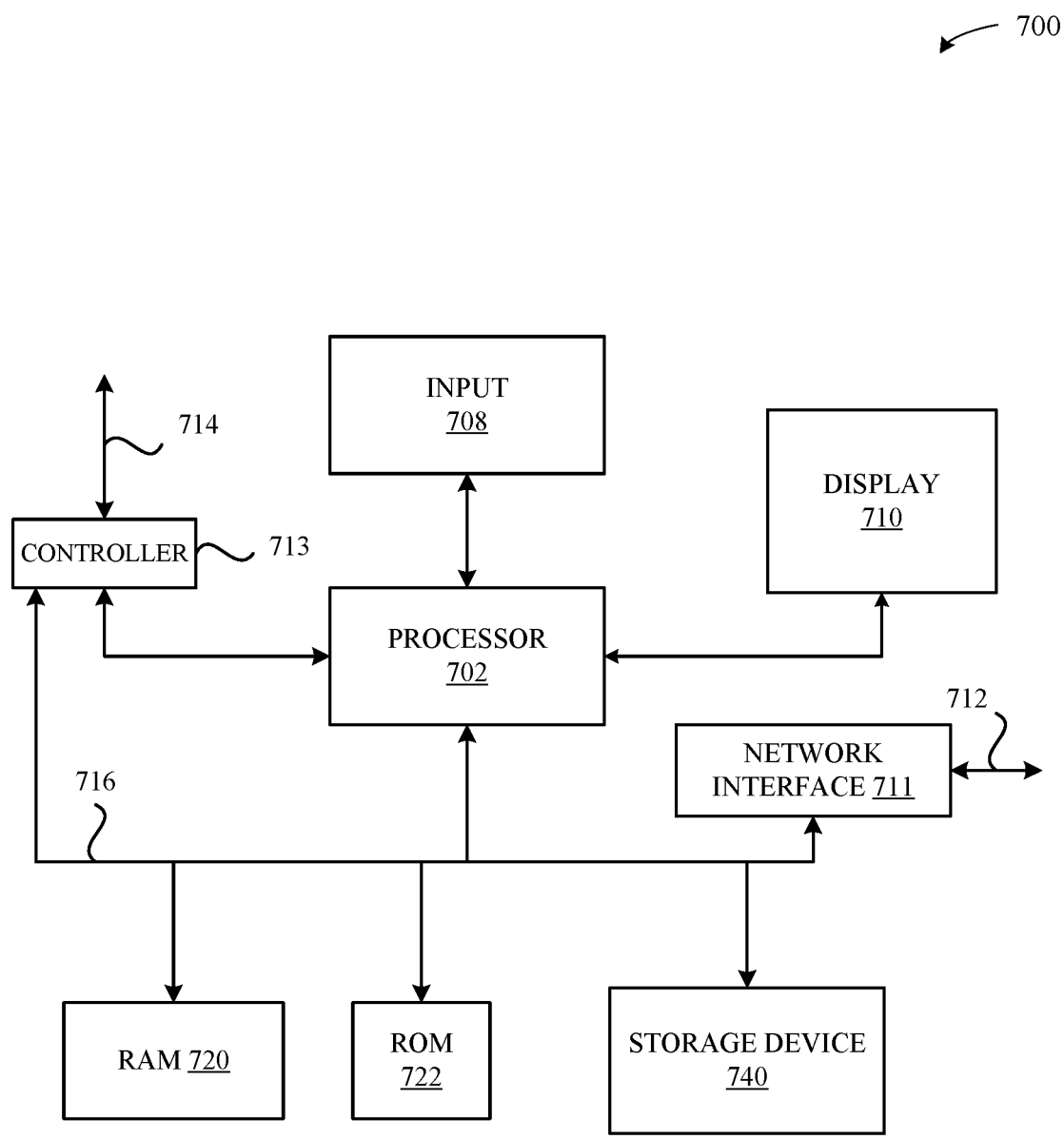
FIG. 7 illustrates a detailed view of a computing device that can be used to implement the various techniques described herein, according to some embodiments.

FIG. 1 illustrates a high-level overview 100 of a computing device 102 that can be configured to perform the various techniques described herein. As shown in FIG. 1, the computing device 102 can include a processor 104, a volatile memory 106 (e.g., a Random-Access Memory (RAM)), and a non-volatile memory 118 (e.g., a storage device). It is noted that a more detailed breakdown of example hardware components that can be included in the computing device 102 is illustrated in FIG. 7, and that these components are omitted from the illustration of FIG. 1 merely for simplification purposes. For example, the computing device 102 can include additional non-volatile memories (e.g., solid state drives, hard drives, etc.), other processors (e.g., a multi-core central processing unit (CPU)), and so on. According to some embodiments, an operating system (OS) 108 can be loaded into the volatile memory 106, where the OS 108 can execute a variety of applications that collectively enable the various techniques described herein to be implemented. As described in greater detail herein, such applications can include a proximity detector 110, a power controller 112, a user activity detector 114, and a learning engine 116.

According to some embodiments, the proximity detector 110 can enable the computing device 102 to detect remote computing devices that are within a threshold distance relative to the computing device 102. For example, the proximity detector 110 can measure a signal strength of signals emitted from a remote computing device, e.g., signals periodically sent by the remote computing device, signals sent by the remote computing device in response to signals sent by the computing device 102, and so on. It is noted that any form of signal can be utilized, e.g., Bluetooth signals, Near Field Communication (NFC) signals, WiFi signals, cellular signals, Ultra-wideband signals (UWB), and so on. Accordingly, the proximity detector 110 can (1) detect the presence of a remote computing device, and (2) calculate an estimate of a distance of the remote computing device relative to computing device 102. In this manner, and as described in greater detail herein, the foregoing functionalities can be utilized to adjust the sleep states of the computing device 102 to provide faster wakeup times while promoting power efficiency.

Additionally, and according to some embodiments, the proximity detector 110 can be configured to detect and analyze device identification data associated with remote computing devices when carrying out the foregoing signal transmission procedures. For example, the proximity detector 110 can be configured to identify specific Media Address Control (MAC) addresses, Internet Protocol (IP) addresses, etc., of remote computing devices so that "foreign" remote computing devices—i.e., remote computing devices that are detectible by, but not known to the computing device 102—can be disregarded when carrying out the sleep state adjustment procedures described herein. According to some embodiments, the device identification data can represent a group of remote computing devices that are associated with the computing device 102. For example, a common user account (e.g., a cloud user account) can associate the computing device 102 with the group of remote computing devices. In this manner, as remote computing devices are associated/disassociated with the common user account, the computing device 102 can continue to identify relevant remote computing devices and respond according to the techniques described herein.

Additionally, it is noted that the embodiments described herein are not limited to only utilizing signal transmissions between the computing device 102 and remote computing devices when attempting to detect proximity conditions. On the contrary, and according to some embodiments, the proximity detector 110 can be configured to analyze data collected through any sensors that can be utilized to identify when remote computing devices—or users themselves are proximate to the computing device 102. The sensors can include, for example, biometric sensors, motion sensors, audio/video sensors, and so on, that enable the computing device 102 to identify when to both (1) prepare the computing device 102 to enter into an awake state (when proximity is detected), and (2) cause the computing device 102 to enter into a deeper sleep state (when proximity is not detected).

Accordingly, the proximity detector 110 can be utilized to identify proximity conditions (or lack thereof) in which the different sleep states of the computing device 102 can be adjusted. According to some embodiments, the different sleep states of the computing device can be adjusted by the power controller 112, which can be configured to increase/decrease/cease the power supplied to various components resident on computing device 102 as it operates within the different sleep states. As described in greater detail herein, these sleep states can include, for example, a high-power sleep state, a mid-power sleep state, a low-power sleep state. It is noted that the foregoing sleep states are merely exemplary, and that any number of sleep states can be implemented on the computing device 102 to achieve a desired level of sleep state granularity. According to some embodiments, the power controller 112 can be configured to send/receive control signals from power resource components (not illustrated in FIG. 1) that are resident on the computing device 102. For example, the power controller 112 can send control signals to power resource components that are capable of adjusting the operating modes of internal components that can include, for example, processor components, memory components, communications components, bus components, and the like.

As described in greater detail herein, the power controller 112 can be a primary component within the computing device 102 and can be configured to manage the sleep states of the computing device 102 based on data gathered/analyzed by the proximity detector 110, the user activity detector 114, and/or the learning engine 116. For example, with respect to the proximity detector 110, this component can be utilized by the power controller 112 to identify when a remote device is nearby or away from the computing device 102, and accordingly adjust the sleep states of the computing device 102. With respect to the user activity detector 114/learning engine 116, these components can gather/learn user activity associated with the computing device 102, and be utilized by the power controller 112 to appropriately adjust the sleep states of the computing device 102. For example, the power controller 112 can determine that a user is likely to awaken the computing device 102 during an anticipated time window (e.g., when the computing device 102 is in a low or mid sleep state), and correspondingly send control signals to power resource components to heighten the sleep state of the computing device based on (e.g., prior to or during) the anticipated time window. In a similar fashion, the power controller 112 can also determine that a user is not likely to awaken the computing device 102 for a predicted time period (e.g., when the computing device 102 is in a high or mid sleep state), and correspondingly send control signals to power resource components to lower the sleep state of the computing device 102 based on (e.g., prior to or during) the predicted time period.

According to some embodiments, the power controller 112 can issue the above-described control signals to cause the computing device 102 to enter into any desired sleep state level (e.g., low, mid, high, etc.). For example, the power controller 112 can issue control signals to increase or decrease the current sleep state of the computing device 102 by a single level. In another example, the power controller 112 can generate control signals that cause the current sleep state of the computing device 102 to transition into a highest-power sleep state or a lowest-power sleep state while bypassing intermediate sleep states (if any). According to some embodiments, the highest-power sleep state can represent a state in which the computing device 102 operates prior to entering into an awake (i.e., fully-operable) state. Conversely, the lowest-power sleep state can represent a sleep state in which the computing device 102 operates period to entering into a suspended (e.g., hibernated) state. Again, it is noted that the foregoing sleep states are merely exemplary, and that any number of sleep states—as well as any level of shift in sleep states—can be implemented within the computing device 102.

Additionally, the power controller 112 also includes the functionality to selectively enable and disable the sleep adjustment procedures under appropriate scenarios. For instance, according to some embodiments, the power controller 112 can include the functionality to detect scenarios in which a remote computing device is generally within the vicinity of computing device 102 and frequently transitions between satisfying and not satisfying a proximity distance threshold value (e.g., a signal strength) during a threshold period of time (e.g., a period of a few minutes). In this scenario, the computing device 102 might transition between the highest-power and lowest-power sleep states (when the sleep adjustment procedures are enabled), which can result in performance/power efficiency degradation. However, as noted above, the power controller 112 can be configured to identify situations in which it is prudent to disable the sleep adjustment procedures to ensure that the performance/power efficiency gains afforded by the techniques described herein remain intact.

Additionally, and as noted above, the user activity detector 114 can enable the computing device 102 to identify scenarios in which the computing device 102 is likely/not likely to be utilized by a user. According to some embodiments, the user activity detector 114 can include the functionality to detect instances in which a user engages computing device 102 in some manner. For example, the user activity detector 114 can record or capture a number of different user input types capable of being received and processed by the computing device 102. For instance, user activity detector 114 can detect a user providing input to computing device 102 through a wired or wireless keyboard, a wired or wireless mouse, a wired or wireless gamepad, a touch sensitive panel coupled to computing device 102, a touch-sensitive display coupled to computing device 102, and the like. In other examples, the user activity detector 114 can detect motion of the computing device 102 that indicates that a user likely will want to awaken the computing device 102 (e.g., when being pulled out of a carrying case and positioned onto a user's lap). In yet other examples, the user activity detector 114 includes the functionality to detect instances in which a user engages computing device 102 through remote computing mechanisms, such as secure shell ("SSH") connections made to the computing device 102.

Additionally, the user activity detector 114 also includes the functionality to generate historical user activity data based on detected user activities, which can be analyzed by the learning engine 116 to establish meaningful observations about user behaviors. According to some embodiments, the learning engine 116 can be configured to correlate instances of user interactions with computing device 102 with specific time periods to identify typical user usage patterns. The user usage patterns can be gathered over time during a particular threshold time period (e.g., hours, days, months, years, etc.) and utilized by the power controller 112 to implement the user-behavior based sleep state adjustment techniques described herein.

Additionally, and as shown in FIG. 1, the computing device 102 can optionally be configured to interact with a server computing device 150 to improve the techniques set forth herein. In particular, at least one remote computing device that is associated with the computing device 102 can be configured to provide information to the server computing device 150 (e.g., a current location of the at least one remote computing device). In turn, the server computing device 150 can analyze the information (and other information) to determine whether there is potential to improve the overall operational efficiency of the computing device 102 by adjusting the sleep state of the computing device 102. According to some embodiments, the server computing device 150 can communicate with the computing device 102 at varying degrees based on the current sleep state of the computing device 102 to cause the computing device 102 to achieve the improved operational efficiency. A more detailed explanation of the manner in which the server computing device 150 can operate is described below in greater detail in conjunction with FIG. 9.

Accordingly, FIG. 1 provides a high-level overview of different hardware/software architectures that can be implemented by computing device 102 in order to carry out the various techniques described herein. A more detailed breakdown of these techniques will now be provided below in conjunction with FIGS. 2A-2B, 3A-3D, and 4-7. It should be noted that in the embodiments and examples set forth herein, a user is generally physically coupled the remote computing devices discussed.

Figure 2A:
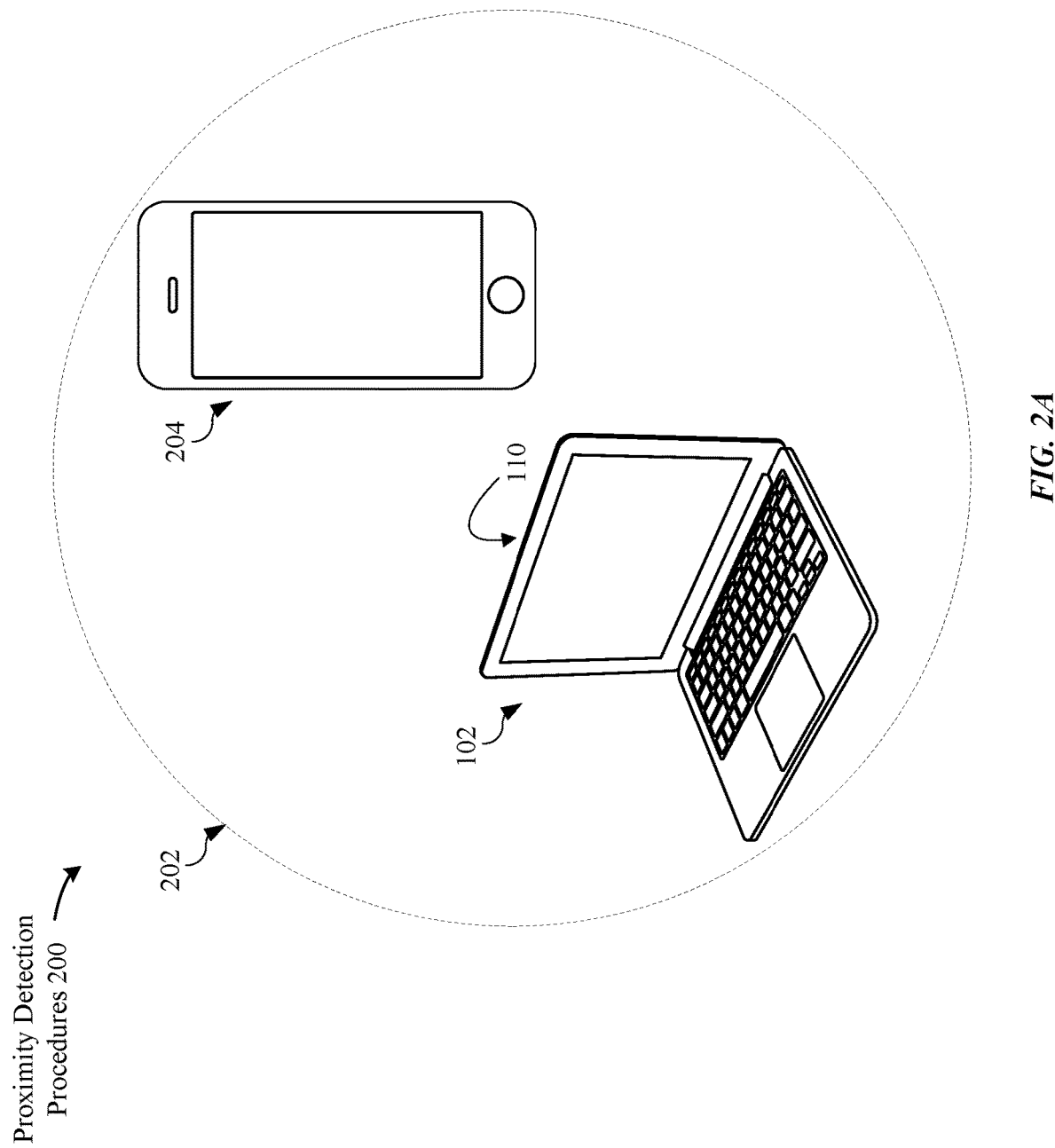
FIGS. 2A-2B illustrate example scenarios of sleep state adjustment procedures performed using proximity detection, according to some embodiments.
Figure 2B:
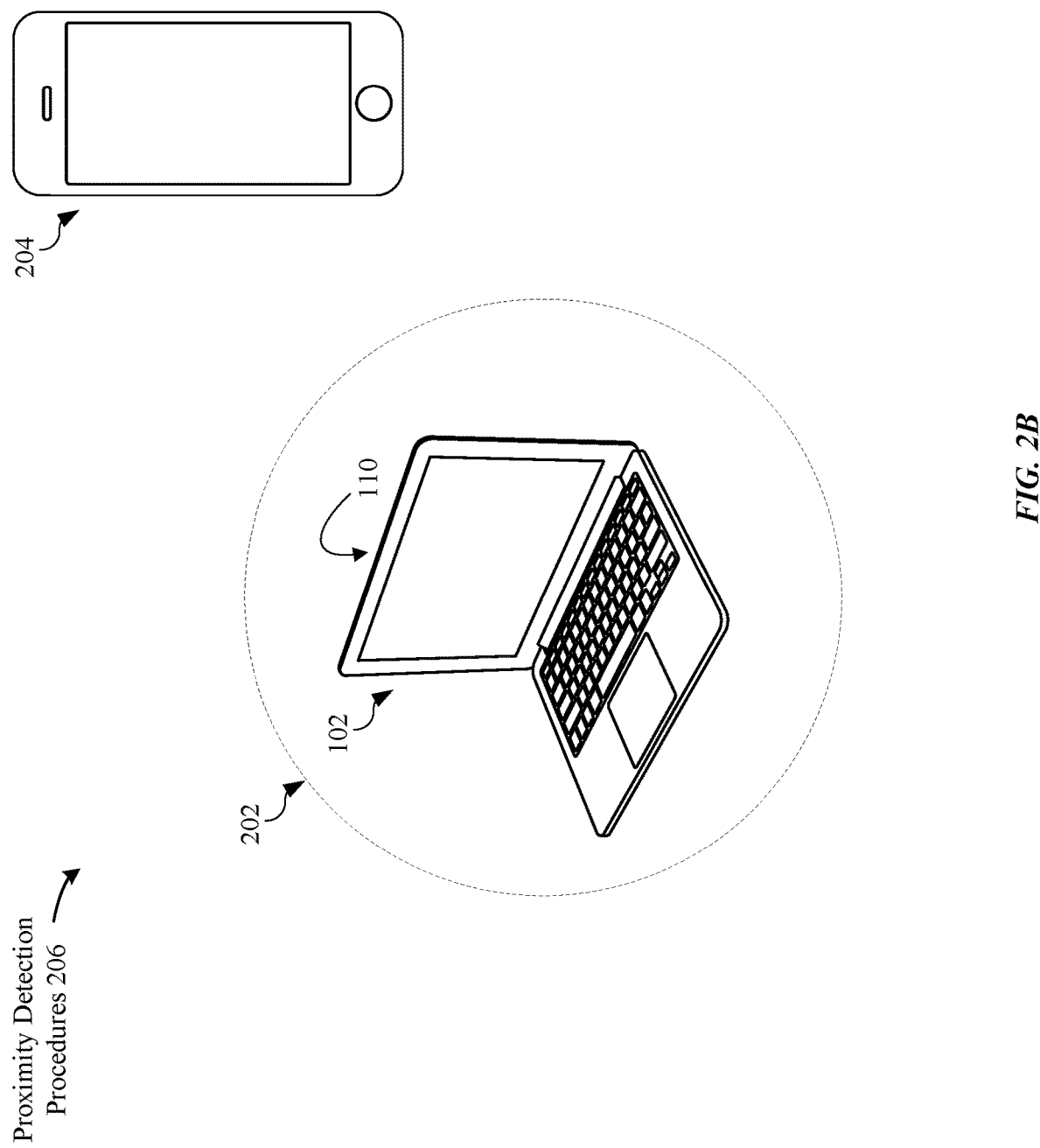

FIGS. 2A-2B illustrate example scenarios of sleep state adjustment procedures performed using proximity detection, according to some embodiments. FIG. 2A depicts two computing devices, a local computing device (e.g., computing device 102) and a remote computing device (e.g., remote computing device 204). In some embodiments, the computing device 102 can be implemented as, for example, a desktop computer, portable electronic device (e.g., laptop computer, audio device, entertainment device, and so on), wireless hand-held devices (e.g., mobile phone, pager, and the like), wireless wearable devices capable of wirelessly transmitting digital information (e.g., electronic watch devices), and so on. The remote computing device 204 can be a device capable of transmitting wireless signals capable of being received and measured for signal strength by the computing device 102. In some embodiments, the remote computing device 204 can include at least some portion of the functionality described herein with respect to the computing device 102.

FIG. 2A also depicts a scenario in which the computing device 102 was removed from a low-power sleep state and placed within a high-power sleep state after detecting the presence of the remote computing device 204 nearby. The computing device 102 can selectively activate or initialize its proximity sensing features to gather proximity data while the computing device 102 operates within an awake state, as well as various sleep states (e.g., high-power sleep states, low-power sleep states, and so on). The proximity detection capabilities of the proximity detector 110 (depicted as installed within the computing device 102) can enable the computing device 102 to detect objects within a detectable distance relative to the computing device 102 based on a pre-determined proximity distance threshold value (e.g., a value corresponding to a proximity radius 202).

According to some embodiments, values below the pre-determined proximity distance threshold value can be an indication of weaker signal detection thereby causing the computing device 102, via the proximity detector 110, to determine that there is no remote computing device nearby. In this fashion, values above the pre-determined proximity distance threshold value can be an indication of stronger signal detection, thereby causing the computing device 102 to determine that there is a remote computing device nearby. For instance, as illustrated by the proximity detection procedures 200 in FIG. 2A, the remote computing device 204 is detected by the computing device 102 as being within the proximity radius 202.

Given this proximity, signals (e.g., Bluetooth signals, WiFi signals, and the like) emitted from the remote computing device 204 are of sufficient strength (e.g., received signal strength (RSS)) such that the computing device 102 can detect both the presence of the remote computing device 204 and also accurately gauge how far away the remote computing device 204 is relative to the computing device 102. In this scenario, given the close proximity of the computing device 102 and the remote computing device 204, the computing device 102 can determine that a user (not depicted in FIG. 2A) is more likely to use the computing device 102 within a pre-determined period of time and correspondingly sends control signals, via the power controller 112 (not depicted in FIG. 2A), to power resource components (e.g., the power controller 112) that increase the amount of power supplied to components resident within the computing device 102.

For instance, circuitry included within the computing device 102 can be sufficiently powered in order to respond to any commands issued by a nearby user. According to some embodiments, the computing device 102 can include audio signal circuitry that can be sufficiently powered to perform voice-activated operations. For example, in one use case, the computing device 102 can be configured, through installed software (e.g., Apple Inc.'s Siri®), to perform various operations in response to voice commands received via one or more microphones coupled to the computing device 102. In another use case, increased sound levels detected by the one or more microphones can be indicative of doors closing or other hints that a user is proximate to the computing device 102 and, thus, likely to engage in use of the computing device 102 within a short period of time.

Indeed, by enabling the power controller 112 to selectively issue control signals in the manner described herein, the circuitry within the computing device 102 can be removed from a previous low-power sleep state and placed within a high-power sleep state. In this fashion, the computing device 102 can operate in a manner that allows it to anticipate user usage while also conserving power resources in a high-power sleep state rather than remaining in a low-power sleep state, which otherwise would require more time to restore the computing device 102 to an awake state.

FIG. 2B depicts a scenario in which the computing device 102 was removed from a high-power sleep state and placed within a low-power sleep state when the remote computing device 204 is no longer nearby. As illustrated by the proximity detection procedures 206 in FIG. 2B, the remote computing device 204 is not detected by the computing device 102, via the proximity detector 110 (depicted as installed within the computing device 102), due to the fact that the remote computing device 204 is not within the proximity radius 202. Given the lack of proximity, any signals emitted from the remote computing device 204 are not strong enough for the computing device 102 to detect the presence of the remote computing device 204. In this scenario, given the lack of proximity between the computing device 102 and the remote computing device 204, the computing device 102 can determine that a user is less likely to use the computing device 102 within the pre-determined period of time. Accordingly, the computing device 102 correspondingly sends control signals, via the power controller 112 (not depicted in FIG. 2B), to power resource components that decrease the amount of power supplied to components resident within the computing device 102.

By issuing control signals in this manner, the computing device 102 can be placed within low-power sleep state and removed from a high-power sleep state. In this fashion, the computing device 102 can operate within a low-power sleep state rather than unnecessarily remaining in a high-power sleep state during a time in which a user is unlikely to engage the computing device 102 in any kind of user activity. In addition to adjusting sleep states based on detecting the proximity of a remote computing device relative to the computing device 102 (as described herein), the embodiments described herein can also analyze user usage patterns to make intelligent sleep state adjustment determinations, which will now be described.

Figure 3A:
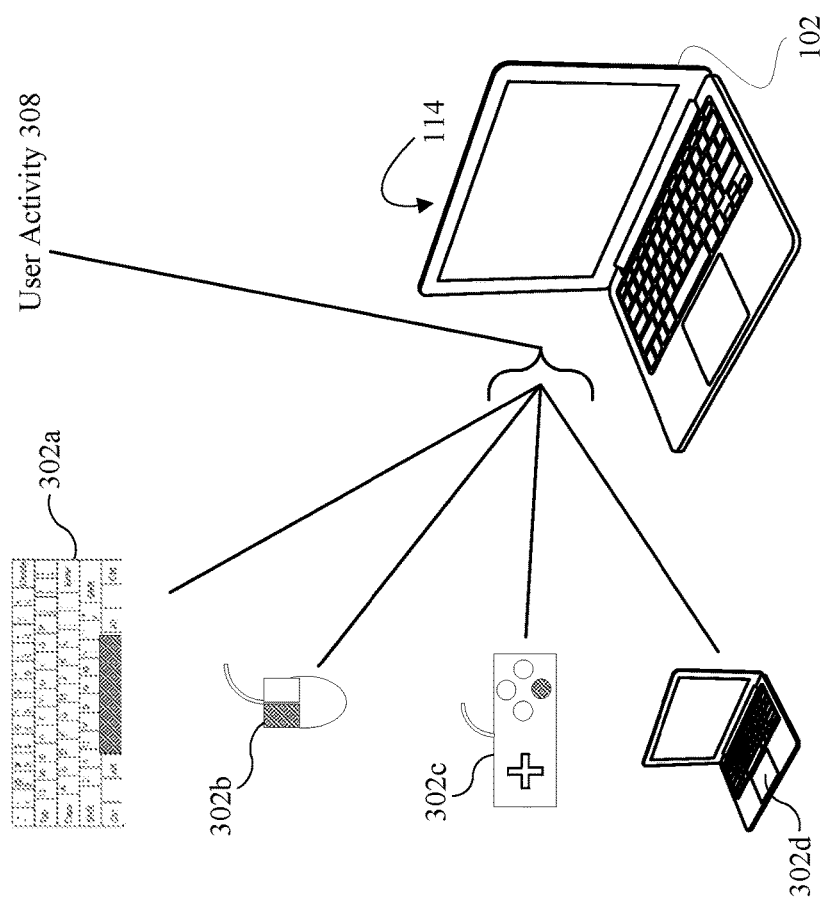
FIG. 3A illustrates example user activity detection procedures used to perform sleep state adjustment procedures, according to some embodiments.

FIG. 3A illustrates an example of user activity detection procedures performed during a sleep state adjustment determination, according to some embodiments. As depicted during user activity detection procedures 300 performed in FIG. 3A, the computing device 102 can detect user activity 308, via the user activity detector 114 (depicted as installed within the computing device 102), which can be in the form of a number of different user input types capable of being received and processed by the computing device 102. For instance, the computing device 102 can detect a user providing input to the computing device 102 through a wired or wireless keyboard (e.g., keyboard 302a). In another example, the computing device 102 can detect a user providing input to the computing device 102 through a wired or wireless mouse (e.g., mouse 302b). In another example, the computing device 102 can detect a user providing input to the computing device 102 through a wired or wireless gamepad (e.g., gamepad 302c). In yet another example, the computing device 102 can detect a user providing input to the computing device 102 through a touch sensitive panel (e.g., panel 302d) or touch-sensitive display. According to some embodiments, the computing device 102 can detect a user providing input to the computing device 102 remotely through secure shell ("SSH") computing procedures (not depicted in FIG. 3A) or similar procedures. It should be noted that the embodiments of the present invention are not limited to the user input types illustrated in FIG. 3A and can include additional types of user input capable of being received and processed by the computing device 102.

Figure 3B:
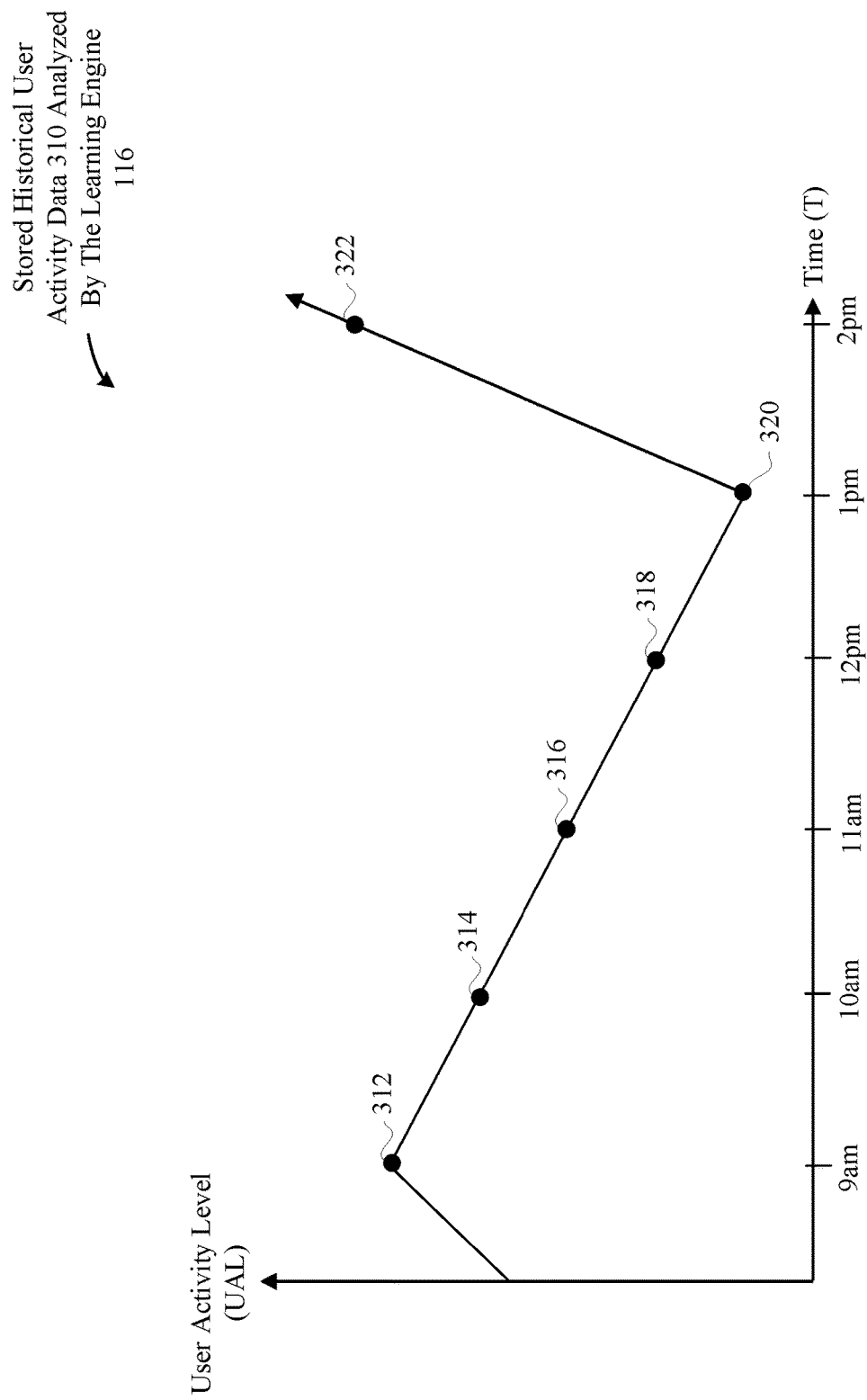
FIGS. 3B-3D illustrate graphical representations of data gathered and analyzed to perform sleep state adjustment procedures, according to some embodiments.

With reference now to the graphical illustration depicted in FIG. 3B, while the computing device 102 operates within an awake state, the computing device 102 (via the learning engine 116) can be configured to analyze stored data related to historical user activity involving the use of the computing device 102. Historical user activity data (e.g., stored historical user activity data 310) stored by the computing device 102 can include user usage patterns performed on the computing device 102 over a period of time (e.g., several days, months, years, and so on). User usage patterns can include activities or events in which the user directly engages the computing device 102 and that occur with a certain degree of regularity in a manner that allows the computing device 102 to accurately predict a future occurrence of the particular user activity. User activities can include the use of the various input devices described herein (e.g., user activity 308) as well as inputs received by the computing device 102 remotely (e.g., SSH procedures). According to some embodiments, historical user activity data can be stored within memory resident on computing device 102.

FIG. 3B depicts a scenario in which the learning engine 116 analyzed data gathered/stored over the course of several months. It should be noted that the user activity level (UAL) depicted in FIG. 3B can be a measurement in the frequency of user-initiated activity performed on the computing device 102. Using the stored historical user activity data 310 depicted in FIG. 3B, the learning engine 116 can determine a user's general usage pattern of the computing device 102 during any given day (e.g., usage pattern between 9 am and 2 pm, which corresponds with times 312, 314, 316, 318, 320, and 322, respectively). For example, as illustrated in FIG. 3B, the stored historical user activity data 310 can be processed in a manner such that the computing device 102 can accurately determine times of the day in which user activity involving the use of the computing device 102 typically begins to decrease (e.g., time 312 which corresponds to approximately 9 am) as well as when usage typically begins to increase (e.g., time 320 which corresponds to approximately 1 pm). As will be described in greater detail herein, the stored historical user activity data 310 can be used to schedule the issuance of both "light"

sleep signals and "deep" sleep signals to adjust a current sleep state level of the computing device 102.

Figure 3C:
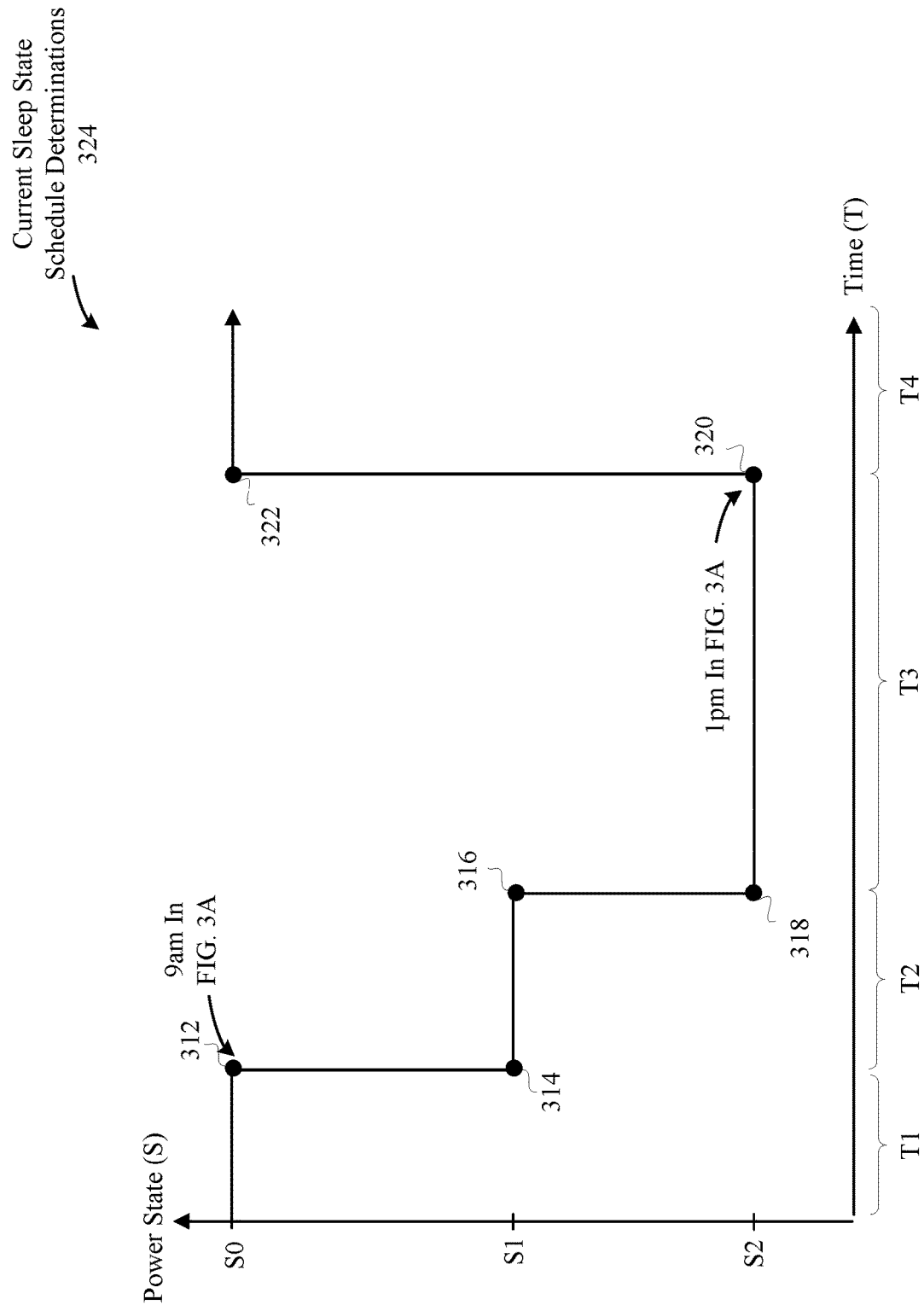

FIG. 3C depicts a graphical illustration of how sleep state operations are performed by the computing device 102, prior to the enactment of the sleep state adjustment procedures described herein. As depicted in the current sleep state schedule determinations 324 in FIG. 3C, the computing device 102 can enter a number of different computing states, "S0", "S1", and "S2," during times 312, 314, 316, 318, 320, and 322. (S0) computing state can represent a fully-functional or "awake" computing state in which the computing device 102 operates in a fully-operational mode such that its resident components are sufficiently powered to fully perform their respective functions.

Sleep state (S1) can represent a sleep state in which the computing device 102 operates within a low-power mode such that components resident within the computing device 102 are supplied with a decreased amount of power relative to an awake computing state. Placing the computing device 102 within sleep state (S1) causes the computing device 102 to save a smaller amount of power relative to sleep state (S2) (which is discussed in greater detail herein), but allows the computing device 102 to be restored to an awake state in a shorter period of time relative to sleep state (S2).

Accordingly, sleep state (S2) can represent a deeper sleep state or "standby" mode in which the computing device 102 operates within an even lower power mode relative to sleep state (S1) such that components residing within the computing device 102 are supplied with minimal power such that the computing device 102 approaches being completely placed within "powered off" state. Placing the computing device 102 within sleep state (S2) allows the computing device 102 to achieve the highest possible power savings relative to sleep state (S1), but comes at the cost of requiring a greater amount of time to restore the computing device 102 to an awake state (e.g., (S0) computing state) relative to sleep state (S1).

As depicted in FIG. 3C during the T1 time period, the computing device 102 is powered-on and operates within the (S0) computing state. During a later phase of the T1 period, the computing device 102 can experience a period of inactivity in which a user may not be actively engaging the computing device 102. Thus, during this later phase of the T1 period, a sleep state policy executed by the computing device 102 can execute local sleep operations such that the computing device 102 begins to operate within the (S1) sleep state toward the end of the T1 period.

During the T2 time period, the computing device 102 continues to operate within the (S1) sleep state. During this period, the computing device 102 saves a smaller amount of power relative to the (S2) sleep state during the T2 time period while enabling the computing device 102 to be able to restore itself to the (S0) computing state in a shorter period of time relative to the (S2) sleep state. During a later phase of the T2 period, the computing device 102 can experience a period of continued inactivity in which a user may still not be engaging the computing device 102 (or be in proximity to the computing device 102). Thus, during this later phase of the T2 period, the sleep state policy executed by the computing device 102 can further engage local sleep operations such that the computing device 102 begins to operate within a "deeper" sleep state, (S2), towards the end of the T2 period.

During the T3 time period, the computing device 102 continues to operate within the (S2) sleep state. During this period, the computing device 102 saves a highest amount of power relative to the (S1) sleep state at the expense of the computing device 102 requiring a greater amount of time to restore itself to the (S0) computing state relative to the amount of time that would be otherwise be required when operating within the (S1) sleep state. As illustrated in FIG. 3C, during a later phase of the T3 period, the computing device 102 can begin to experience a period of renewed user activity in which the user begins to re-engage the computing device 102 (or enter into proximity of the computing device 102). Thus, during this later phase of the T3 period, the sleep state policy executed by the computing device 102 can initialize operations that remove the computing device 102 from the (S2) sleep state and restore itself to an awake (S0) computing state at the beginning of the T4 period.

Figure 3D:
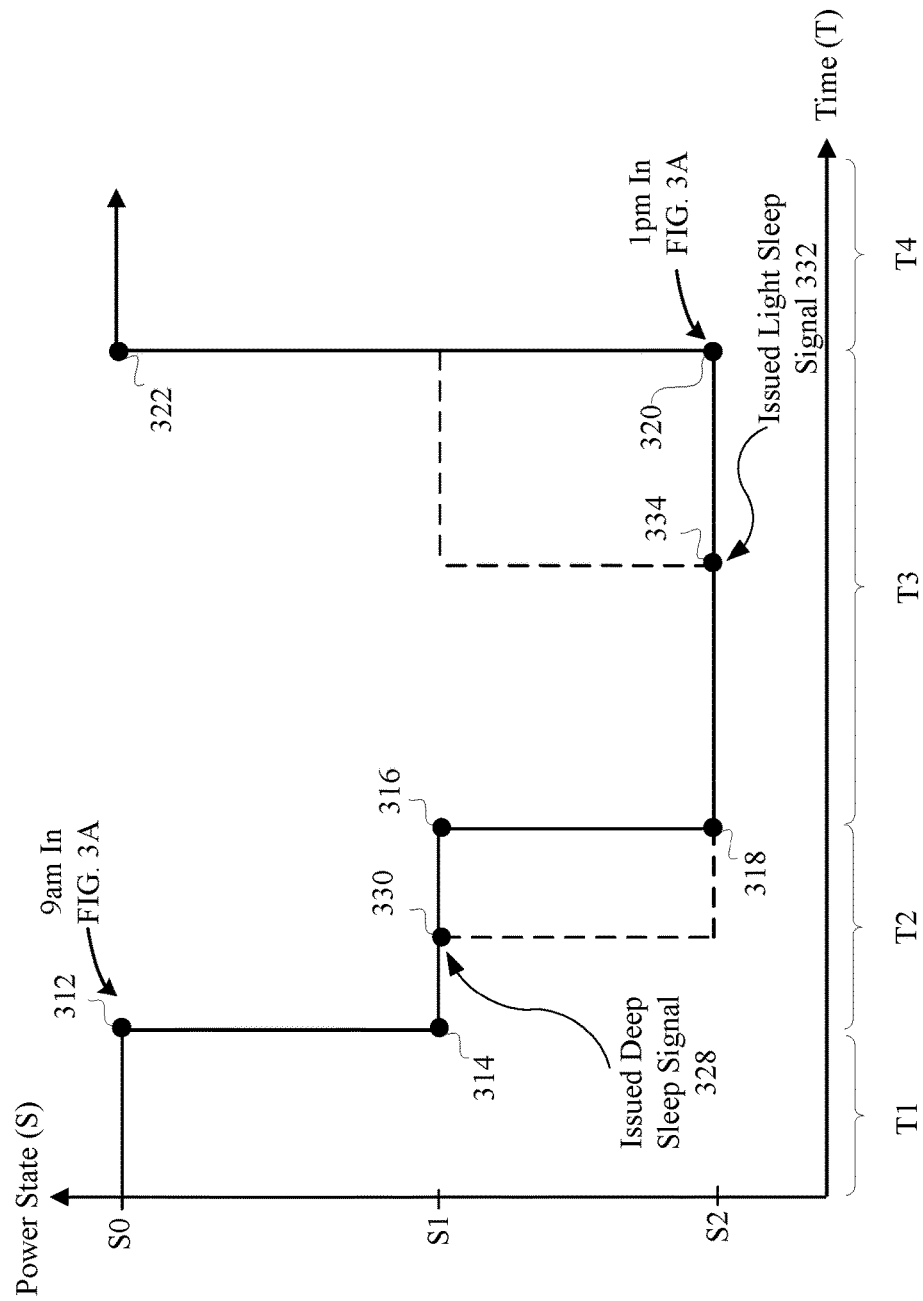

FIG. 3D depicts a graphical illustration of how the computing device 102 can use stored historical user activity data to schedule and issue deep sleep and light sleep signals that adjust sleep states, according to some embodiments. Using, the learning engine 116 (not depicted in FIG. 3D), the computing device 102 can correlate typical user usage patterns gathered from the historical user activity data accumulated over a period of time (e.g., stored historical user activity data 310 in FIG. 3B) with the scheduling of deep sleep signals (e.g., deep sleep signal 328) and light sleep signals (e.g., light sleep signal 332).

As depicted by the sleep adjustment procedures 326 illustrated in FIG. 3D, the deep sleep and light sleep signals can be issued, via the power controller 112, in accordance with scheduled times. In particular, and as illustrated in FIG. 3D, the power controller 112 can schedule the issuance of the deep sleep signal 328 at a time 330 (e.g., 10:30 AM in FIG. 3B), which occurs between times 314 (e.g., 10 AM in FIG. 3B) and 316 (e.g., 11 AM in FIG. 3B). Accordingly, time 330 can be recognized as a time in which the computing device 102 typically experiences decreased user activity (based on historical user activity data gathered) and in which the computing device 102 typically operates within the (S1) sleep state. In this regard, and with further reference to FIG. 3D, the deep sleep signal 328 can be issued by the power controller 112 to decrease the amount of power supplied to one or more components of the computing device 102, thereby causing the computing device 102 to enter into the (S2) computing state at time 330.

By placing the computing device 102 into the (S2) sleep state in this manner, the computing device 102 can reside in a lowest possible sleep state (e.g., "standby" mode) for a larger portion of the T2 period, whereas, prior to the scheduling of deep sleep signal 328, the computing device 102 would have continued to operate within the (S1) computing state for the entire duration of the T2 period (as depicted by the solid lines between the times 314 and 316 in FIG. 3D). In this fashion, through the use of the scheduling procedures described herein, the computing device 102 can use historical user activity data gathered over time to accurately predict a time period in which the user will likely not use the computing device 102 and intelligently decrease the amount of power it can save during that time period.

Additionally, as illustrated in FIG. 3D, the power controller 112 can schedule the issuance of the light sleep signal 332 at time 334 (e.g., 12:30 PM in FIG. 3B), which occurs between times 318 (e.g., 12 PM in FIG. 3B) and 320 (e.g., 1 PM in FIG. 3B). Accordingly, time 334 can be recognized as a time in which the computing device 102 typically experiences continued inactivity (based on historical user activity data gathered) and a time in which the computing device 102 typically remains in the (S2) sleep state. In this regard, and with further reference to FIG. 3D, the light sleep signal 332 can be issued to instruct resident power resources of the computing device 102 to increase the amount of power supplied to one or more components of computing device 102, thereby causing the computing device 102 to enter into the (S1) sleep state at time 334.

By placing the computing device 102 into the (S1) sleep state in this manner, the computing device 102 can operate in a high-power sleep state for larger portion of the T3 period, whereas, prior to the scheduling of the light sleep signal 332, the computing device 102 would have continued to operate within the S2 computing state for the entire duration of the T3 period (as depicted by the solid lines between times 318 and 320 in FIG. 3D). In this fashion, through the use of the scheduling procedures described herein, the computing device 102 can use historical user activity data gathered over time to accurately predict a time period in which the user will likely use the computing device 102. The issuance of the light sleep signal 332 advantageously increases the amount of power supplied to the computing device 102 at point just prior to the predicted user activity. Accordingly, the computing device 102 can more quickly be restored to the (S0) computing state and be fully-functional in less time (relative to the (S2) sleep state).

Figure 4:
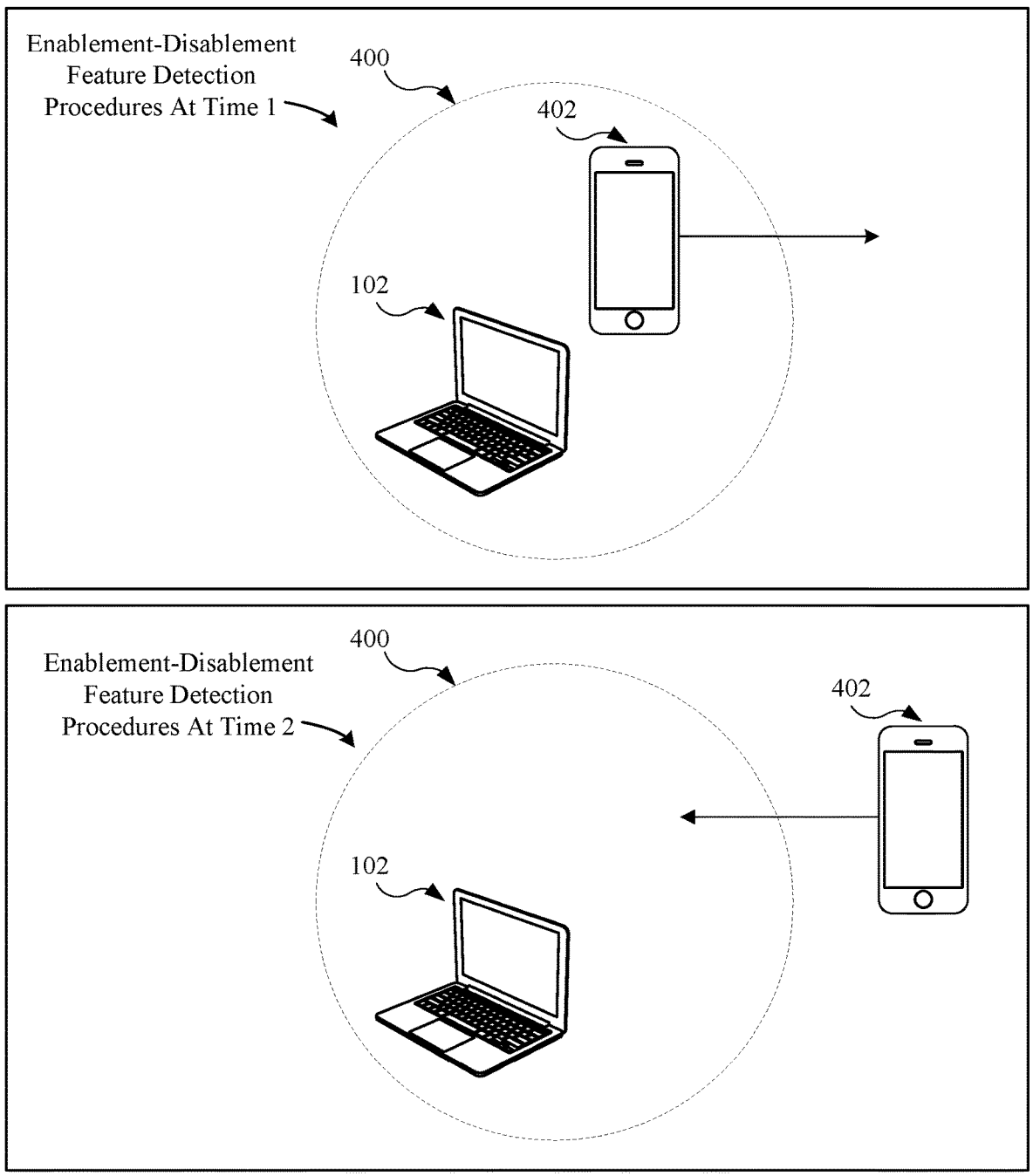
FIG. 4 illustrates example scenarios of selectively enabling and disabling sleep state adjustment procedures, according to some embodiments.

FIG. 4 depicts procedures in which computing device 102 can selectively enable and disable sleep state adjustment procedures in accordance with embodiments of the present invention. As described herein, the computing device 102 can detect scenarios in which a remote computing device is generally within the vicinity of computing device 102 and oscillates between satisfying and not satisfying a proximity distance threshold value (e.g., proximity radius 400) during a pre-determined period of time (e.g., period of a few minutes). By selectively enabling and disabling the sleep state adjustment procedures described herein, the computing device 102 can be able to advantageously detect scenarios in which a user coupled to remote computing device 402 is generally within the vicinity of computing device 102 and is incidentally crossing the proximity radius 400 for only a brief period of time.

For example, a user holding remote computing device 402 may be momentarily walking away from the computing device 102 (e.g., a laptop) at Time 1 to grab coffee in a nearby room and incidentally crosses the proximity radius 400 during the process, only to return to using the computing device 102 a short time thereafter during Time 2. In another example, the user may be performing a number of tasks that require the user holding the remote computing device 402 to return and leave the general location of computing device 102 a number of times. Accordingly, the computing device 102 can be configured to prevent itself from adjusting sleep states (e.g., (S1) sleep state, (S2) sleep state) in response to identifying that the remote computing device 402 oscillates from being proximate to not proximate within a threshold period of time.

Figure 5:
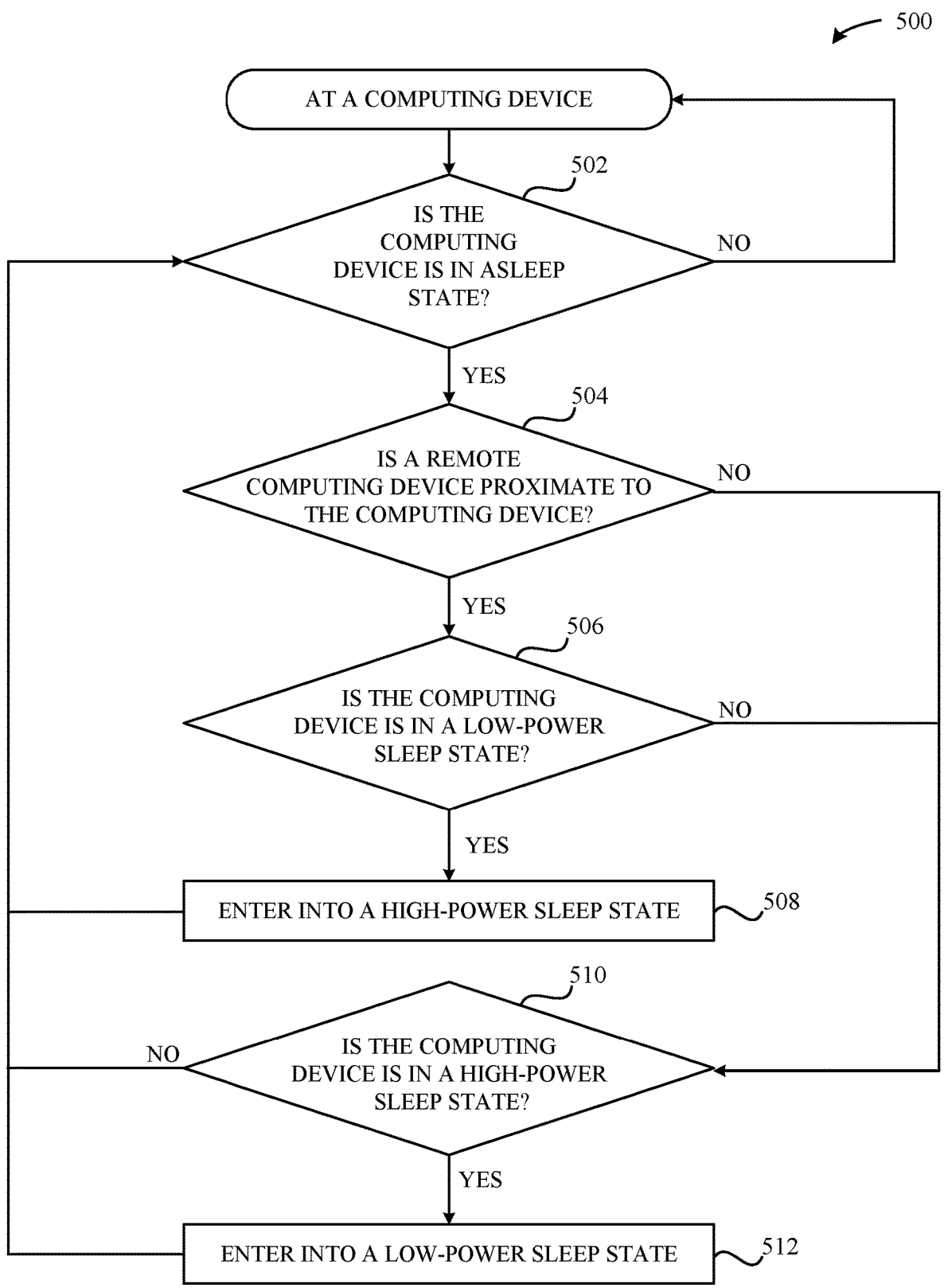
FIG. 5 illustrates a first method for adjusting sleep states of a computing device based on a proximity of a remote computing device, according to some embodiments.

FIG. 5 illustrates a method 500 for adjusting sleep states of a computing device based on a proximity of a remote computing device to the computing device, according to some embodiments. As shown in FIG. 5, the method 500 can be implemented by the computing device 102, and begins at step 502, where the computing device 102 determines whether it is in a sleep state. Sleep states can include, for example and as described herein, low-power sleep states and high-power sleep states. If the computing device 102 determines that it is in a sleep state, then the computing device 102 next determines whether a remote computing device is proximate to the computing device 102, as described in step 504. Otherwise, the computing device 102 determines that it is not in a sleep state and the computing device 102 can continue monitoring to determine if it is in a sleep state. If the computing device 102 determines that it is not in a sleep state, it can operate within an awake state due to detected user activity involving the use of the computing device. Once user activity is no longer detected, the computing device can proceed to step 502 to determine whether it is currently in a sleep state.

At step 504, the computing device 102 can determine whether a remote computing device is proximate to the computing device 102. Given that the computing device 102 determined that is currently within a sleep state at step 502, the computing device 102 then makes determinations as to whether it should enter a high-power sleep state or a low-power sleep state based on proximity to a remote computing device. If the computing device 102 determines that a remote computing device is proximate to the computing device 102, then the computing device 102 next determines whether it is currently in a low-power sleep state, as described in step 506. Otherwise, the computing device 102 determines whether it is currently in a high-power sleep state, as described in step 510.

At step 506, the computing device determines whether it is currently in a low-power sleep state. Given that the computing device 102 determined that a remote computing device is proximate to the computing device 102 at step 504, the computing device 102 then makes determinations as to whether it should enter a high-power sleep state. If the computing device 102 determines it is currently in a low-power sleep state, then the computing device 102 enters into a high-power sleep state, as described in step 508. Otherwise, the computing device 102 next determines whether it is currently in a high-power sleep state, as described in step 510.

At step 508, the computing device 102 enters into a high-power sleep state. Given that the computing device 102 determined that the remote computing device is proximate to the computing device 102 at step 504 and was in a low-power sleep state at step 506, the computing device 102 determines that a user coupled to the remote computing device is more likely to use the computing device 102 within a pre-determined period of time and therefore sends control signals to power resource components that increase the amount of power supplied to components resident within the computing device 102.

At step 510, the computing device 102 determines whether it is currently in a high-power sleep state. Given that the computing device 102 determined that a remote computing device is not proximate to the computing device 102 at step 504, the computing device 102 then makes determinations as to whether it is currently operating within a high-power sleep state. If the computing device 102 is in a high-power sleep state, the computing device 102 enters into a low-power sleep state, as described in step 512. Otherwise, the computing device 102 determines whether it is in a sleep state, as described in step 502.

At step 512, the computing device 102 enters into a low-power sleep state. Given that the computing device 102 determined that a remote computing device is not proximate to the computing device at step 504 and that it is not currently operating within a high-power sleep state at step 510, the computing device 102 determines that a user coupled to the remote computing device 102 is less likely to use the computing device within a pre-determined period of time and therefore sends control signals to power resource components that decrease the amount of power supplied to components resident within the computing device. In addition, the computing device proceeds to make determinations as to whether it is currently in a sleep state, as described in step 502.

Figure 6:
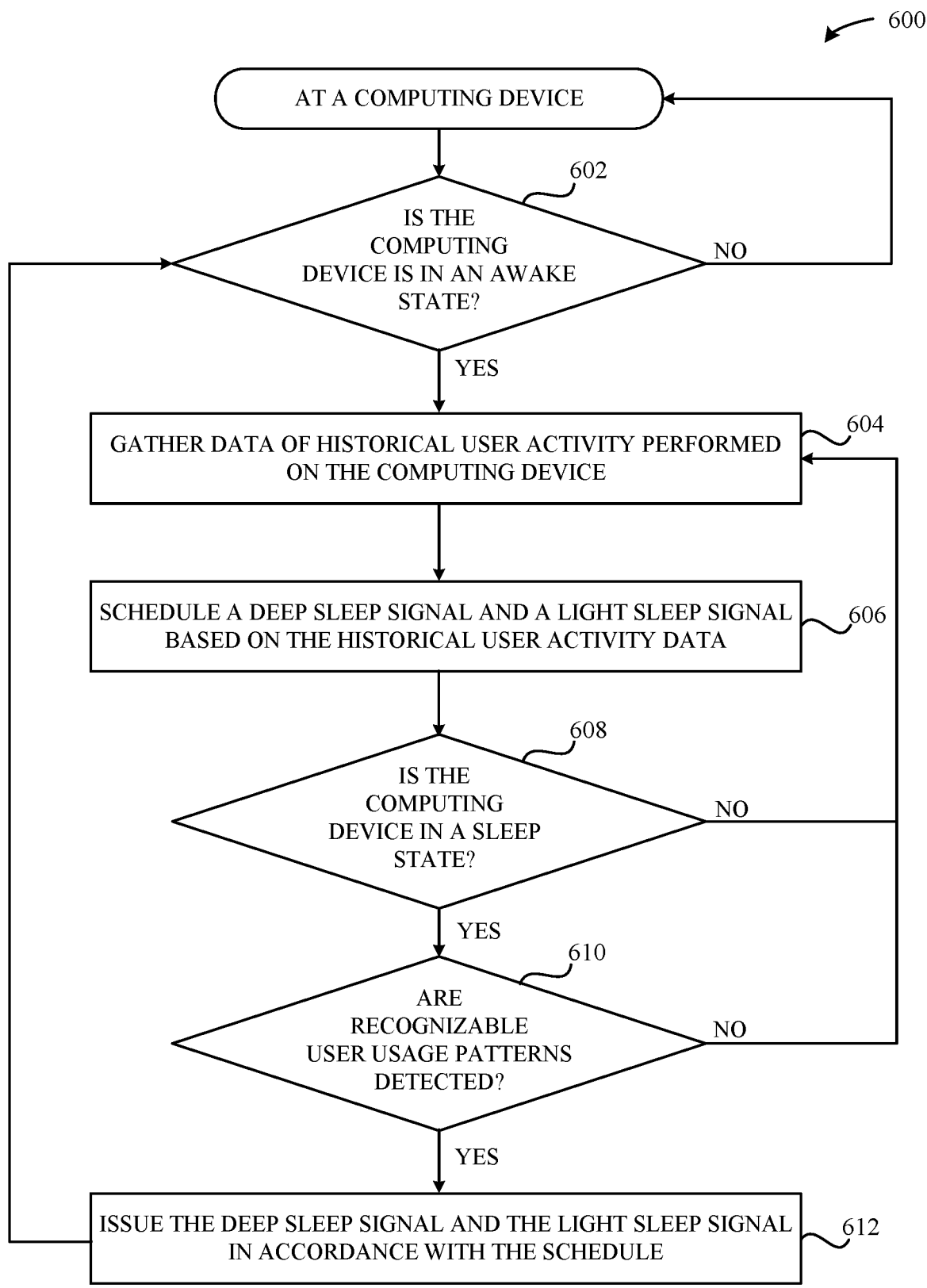
FIG. 6 illustrates a second method for adjusting sleep states based on historical user activity, according to some embodiments.

FIG. 6 illustrates a method 600 for adjusting sleep states based on historical user activity, as described herein according to some embodiments. As shown in FIG. 6, the method 600 can be implemented by a computing device 102, and begins at step 602, where the computing device 102 determines whether it is in an awake state. If the computing device 102 determines that it is in an awake state, the computing device 102 next gathers data of historical user activity performed on the computing device 102, as described in step 604. Otherwise, the method 600 determines that the computing device 102 is not in an awake state and waits for the computing device to enter an awake state.

At step 604, the computing device 102 gathers data related to historical user activity performed on the computing device 102. The historical user activity data is used by the computing device 102 to accurately determine times of the day in which user activity involving the use of the computing device 102 typically begins to decrease as well as when usage typically begins to increase so that the scheduled deep sleep and light sleep signals correspondingly increase and decrease power supplied during the sleep state at the appropriate times. At step 606, the computing device 102 schedules a deep sleep signal and a light sleep signal based on the historical user activity data gathered.

At step 608, the computing device 102 determines whether it is in a sleep state. Given that the computing device 102 scheduled a deep sleep signal and a light sleep signal at step 606, the computing device 102 waits for the next sleep state to issue the signals in accordance with the determined schedule. If the computing device 102 is in a sleep state, then the computing device 102 next determines whether it detected recognizable user usage patterns, as described in step 610. Otherwise, the computing device 102 continues to gather data of historical user activity performed on it, as described in step 604.

At step 610, the computing device 102 determines whether it detected recognizable user patterns. Given that the computing device 102 has determined that is currently within a sleep state, the computing device 102 determines whether recognizable user usage patterns are detected based on the historical user activity data gathered during step 604. If the computing device 102 detected recognizable user usage patterns, then the computing device 102 issues the deep sleep signal and the light sleep signal in accordance with the schedule, as described in step 612. Otherwise, the computing device 102 continues to gather data of historical user activity performed on the computing device 102, as described in step 604.

FIG. 7 illustrates a detailed view of a computing device 700 that can be used to implement the various components described herein, according to some embodiments. In particular, the detailed view illustrates various components that can be included in the computing device 102 illustrated in FIG. 1. As shown in FIG. 7, the computing device 700 can include a processor 702 that represents a microprocessor or controller for controlling the overall operation of the computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, and so on. Still further, the computing device 700 can include a display 710 that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include a wireless transceiver.

As noted above, the computing device 700 also include the storage device 740, which can comprise a single disk or a collection of disks (e.g., hard drives), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of applications executing on the computing device 102, including the proximity detector 110, the power controller 112, the user activity detector 114, and the learning engine 116.

Figure 8:
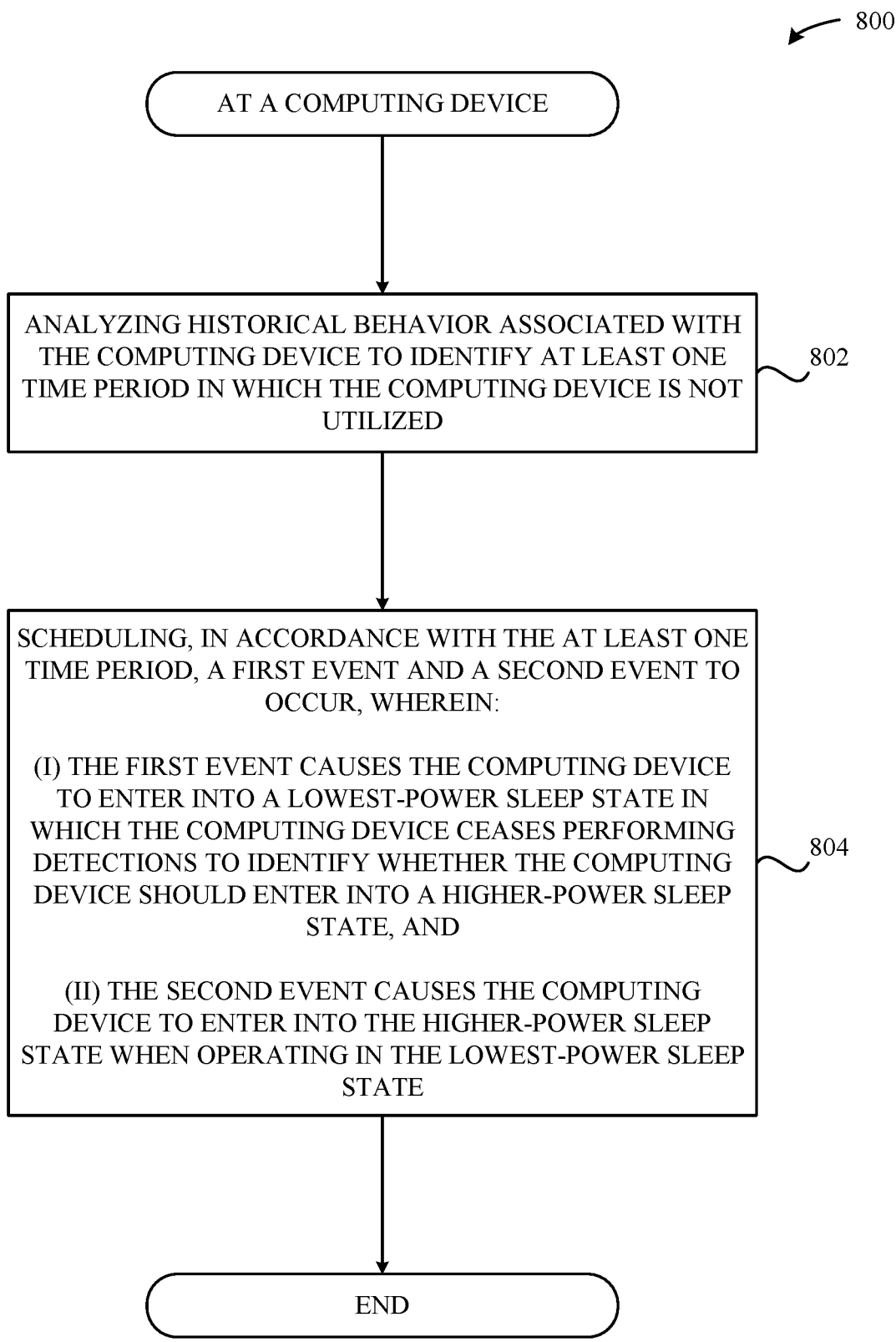
FIG. 8 illustrates another method for adjusting sleep states of a computing device, according to some embodiments.

Additionally, FIG. 8 illustrates a method 800 for adjusting the sleep states of a first computing device 102 based on a proximity of a second computing device 102, according to some embodiments. As shown in FIG. 8, the method 800 begins at step 802, where the computing device 102 analyzes historical behavior associated with the computing device 102 to identify at least one time period in which the computing device 102 is not utilized (e.g., in accordance with the various techniques set forth herein). At step 804, the computing device 102 schedules, in accordance with the at least one time period, a first event and a second event to occur. In particular, and according to some embodiments, the first event causes the computing device 102 to enter into a lowest-power sleep state in which the computing device 102 ceases performing detections to identify whether the computing device 102 should enter into a higher-power sleep state. Conversely, and according to some embodiments, the second event causes the computing device 102 to transition from the lowest-power sleep state to the higher-power sleep state, where the computing device 102 resumes performing at least some of the detections.

According to some embodiments, the detections described above in conjunction with step 804 of FIG. 8 can include detecting a presence of a user who is associated with the computing device 102. In particular, the presence of the user can be detected using sonar/radar output by the computing device 102. For example, one or more components included in the computing device 102 can be configured to utilize sonar/radar to detect when (i) an object is nearby, and (ii) the object is in motion, which indicates that the object is a person, and not simply an inanimate object (e.g., a lamp). According to some embodiments, the computing device 102 can be aware of a general profile of the user (e.g., weight, height, etc.) (or other authorized users) that can be compared against what is detected through sonar/radar. In this regard, the computing device 102 can be configured to disregard the presence of people/animals who do not match the profile of the user, and who should therefore be disregarded by the computing device 102 when determining whether to escalate the power level of the computing device 102 when the computing device 102 is in a sleep state.

Additionally, the presence of the user can be detected using (iii) detected motion of the computing device 102 itself. According to some embodiments, the motion can be detected using any hardware device capable of detecting motion that is caused by a user, e.g., accelerometers, torsion sensors, heat sensors, and so on, included in the computing device 102. For example, the computing device 102 can be configured to detect when it is picked up, moved across a room, and so on. Additionally, the computing device 102 can be configured to disregard motion that likely is not being caused by a user, e.g., repetitive motion caused by a car, a train, an airplane, and so on.

Additionally, the presence of the user can be detected using (iv) voice identification, so long as the user provides permission to do so. According to some embodiments, voices can be detected using any hardware capable of detecting sound, e.g., microphones, included on the computing device 102. According to some embodiments, the voice identification can be generic and configured to simply detect the presence of any user within the vicinity of the computing device 102. However, in some embodiments, the voice identification can be advanced, where the computing device 102 attempts to match detected voice information against a general profile of the user that describes aspects of the user's voice. In this regard, the computing device 102 can be configured to disregard the voices of individuals who are not authorized to operate the computing device 102, thereby saving energy when such individuals carry out conversations in proximity to the computing device 102.

Additionally, the detections described above in conjunction with step 804 of FIG. 8 can include detecting a presence of a second computing device 102 that is associated with the computing device 102 (e.g., in accordance with the various techniques set forth herein). For example, the computing device 102 can receive at least one data packet from the second computing device 102—either in response to at least one data packet transmitted by the computing device 102 (e.g., when the computing device 102 is in a search mode), and/or by the volition of the second computing device 102 itself (e.g., when the second computing device 102 is in a broadcast mode). According to some embodiments, and as previously described herein, the computing device 102 and/or the second computing device 102 can be configured to calculate a physical distance between one another—which, as described in greater detail below, can affect the manner in which one or more of the computing device 102 or the second computing device 102 operate.

According to some embodiments, the level of the higher-power sleep state (described above at step 804) can scale in accordance with the distance between the computing device 102 and the second computing device 102. In one scenario, the computing device 102 can implement a series of distance zones that each define a particular level of the higher-power sleep state that is activated at the computing device 102. For example, a first distance zone can dictate that a first-level-power sleep state should activated when the second computing device 102 is less than or equal to ten feet from the computing device 102. Continuing with this example, a second distance zone can dictate that a second-level-power sleep state should be activated when the second computing device 102 is greater than ten feet—but less than or equal to twenty feet—from the computing device 102. Still continuing with this example, a third distance zone can dictate that a third-level-power sleep state should be activated when the second computing device 102 is greater than twenty feet—but less than or equal to thirty feet—from the computing device 102. Still continuing with this example, a fourth distance zone can dictate that the a lowest-power sleep state should be activated when the second computing device 102 is greater than thirty feet from (or not detectible by) the computing device 102. It is noted that any number of distance zones and corresponding sleep state power levels can be implemented without departing from the scope of this disclosure.

Additionally, the level of the higher-power sleep state (described above at step 804) can scale in accordance with an amount of time that the second computing device 102 remains within the distance zone at a level of acceptability. According to some embodiments, implementing this technique can involve the computing device 102 verifying that the second computing device 102 remains within a particular distance zone for a respective threshold period of time prior to activating the sleep state power level that corresponds to the distance zone. For example, the first distance zone described above can require that the second computing device 102 is less than or equal to ten feet from the computing device 102 for at least ten seconds prior to activating the first-level-power sleep state. In another example, the second distance zone described above can require that the second computing device 102 is greater than ten feet—but less than or equal to twenty feet—from the computing device 102 for at least fifteen seconds prior to activating the second-level-power sleep state. It is noted that the foregoing scenarios are exemplary, and that any time restrictions, at any level of granularity, can be implemented without departing from the scope of this disclosure. For example, the computing device 102 can be configured to disregard when the second computing device 102 switches between different distance zones so long as the second computing device 102 does not remain in the distance zones for a threshold period of time. In this manner, the computing device 102 can avoid scenarios where its sleep state is not elevated due to the second computing device 102 undergoing continuous movement throughout the distance zones for a period of time, which should otherwise appropriately cause the computing device 102 to elevate its sleep state by at least one level.

Additionally, it is noted that the various sleep states described herein can cause the computing device 102 to perform the detection operations at varying levels of intensity. For example, when the computing device 102 transitions from the lowest-power sleep state to the first-level-power sleep state, the computing device 102 can be configured to carry out the detection procedures at first rate that is commensurate with the first-level-power sleep state. For example, if the computing device 102 is configured to issue requests for nearby computing devices—e.g., the second computing device 102—to report their presence, the computing device 102 can be configured to issue such requests at a first frequency rate that is defined by the first-level-power sleep state. In another example, the computing device 102 can be configured to process, at a first power rate that is defined by the first-level-power sleep state, gathered information (e.g., sonar data, radar data, microphone data, accelerometer data, etc.) that potentially indicates the presence of a user. In this regard, the aforementioned rates can scale in accordance with the sleep state that is currently active on the computing device 102.

Additionally, it is noted that the computing device 102 can be configured to analyze operational aspects of the computing device 102 when the computing device 102 enters into the higher-power sleep state. In particular, the computing device 102 can be configured to monitor amounts of time spent in any sleep states that exceed the lowest-power sleep state to identify conditions in which it was not beneficial for the computing device 102 to transition to the higher-power-sleep states. For example, the computing device 102 can determine that the computing device 102 transitioned from operating in the lowest-power sleep state to operating in the highest-power sleep state, but that the computing device 102 remained in the highest-power sleep state—without being woken up/utilized by a user—for a prolonged period of time. In turn, the computing device 102 can be configured to update the historical information associated with the computing device 102. In this regard, the historical information—when analyzed at a subsequent time by the computing device 102 when scheduling sleep elevation events—can help prevent situations where the computing device 102 unnecessarily remains in a higher-power sleep state, which might otherwise occur if the historical information is not updated.

Additionally, and as previously described herein, the computing device 102 can be configured to optionally interact with a server computing device 150 to obtain additional information that can enable the computing device 102 to increase the accuracy by which the computing device 102 activates the various sleep states described herein. In one example scenario, the server computing device 150 can identify that a user of the computing device 102 is and/or will not be in proximity to the computing device 102 for an amount of time. For example, situations can arise where the user forgets to bring his or her computing device 102 (e.g., a laptop) to work, but brings or her second computing device 102 (e.g., a phone) to work. In this example, the computing device 102 would likely remain in a high-power sleep state given the computing device 102 is normally utilized by the user throughout the day when he or she is at work. However, as noted above, the second computing device 102 can be configured to provide additional information that can improve the overall accuracy of the techniques set forth herein. For example, the second computing device 102 can share its current location with the server computing device 150 (assuming the user has permitted the second computing device 102 to do so). In turn, the server computing device 150 can determine that it would be beneficial to contact the computing device 102—e.g., via a network connection that remains active between the computing device 102 and the server computing device 150 while the computing device 102 remains in the high-power sleep state—and instruct the computing device 102 to enter into a lower-power sleep state to conserve energy.

In another example scenario, the server computing device 150 can access a calendar associated with the user (assuming the user has permitted the server computing device 150 to do so) to identify time periods in which the user likely will not be in proximity to/utilize the computing device 102. It is noted that the server computing device 150 can perform any level of analysis against the calendar without departing from the scope of this disclosure. For example, the server computing device 150 can perform language processing on calendar entries within the calendar to identify athletic activity—e.g., biking, rowing, hiking, etc.—where it is highly unlikely that the computing device 102 will not be utilized. It is noted that the type of computing device 102 can be taken into account as well, e.g., whether the computing device 102 is a desktop computer, a laptop computer, a tablet computer, and so on, to improve the expected utilization of the computing device 102 in view of the language processing. Further, the computing device 102 can analyze prior/recurring calendar events against historical usage to identify whether non-obvious calendar entries imply whether the computing device 102 will be utilized. For example, the calendar can indicate a recurring lunch meeting with a friend, where the computing device 102 has historically not been utilized during the lunch meeting. In this regard, the server computing device 150 can identify that the computing device 102 can enter into a lower-power sleep state during the lunch meeting with a low likelihood that the computing device 102 user will seek to utilize the computing device 102.

Accordingly, the server computing device 150 can be configured to take any of the above-described aspects into account, and, when appropriate, cause the computing device 102 to enter into a lower-power sleep state. Additionally, the server computing device 150 can take any of the above-described aspects into account, and cause the computing device 102 to schedule an event that will cause the computing device 102 to enter into a higher-level sleep state. This is beneficial, for example, when the server computing device 150 identifies that a user will likely return to/utilize the computing device 102 after a period of inactivity, and where it will be beneficial for the computing device 102 to enter into a higher-power sleep state that will enable the computing device 102 to wake in a shorter period of time. For example, the server computing device 150 can determine that the user is traveling home (and toward the computing device 102) and will likely utilize the computing device 102 at an upcoming time. It is noted that while the foregoing aspects are described as being implemented by the server computing device 150, they can also be implemented by one or more of the computing device 102 and the second computing device 102, in addition to the server computing device 150 or in lieu of the server computing device 150, without departing from the scope of this disclosure.

Figure 9:
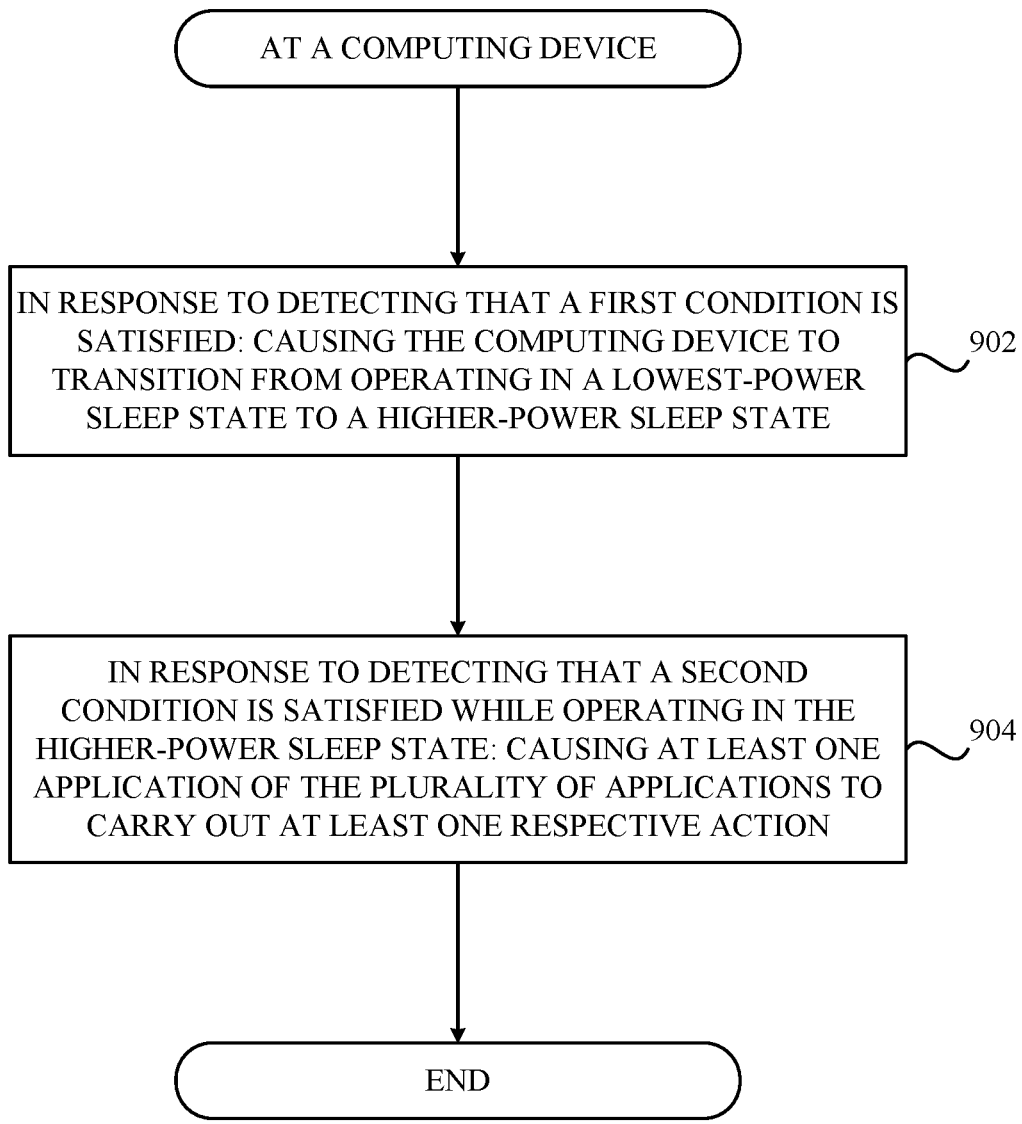
FIG. 9 illustrates a method for managing a plurality of applications on a computing device in accordance with sleep states under which the computing device is operating, according to some embodiments.

FIG. 9 illustrates a method 900 for managing a plurality of applications on the computing device 102 in accordance with sleep states under which the computing device 102 is operating, according to some embodiments. As shown in FIG. 9, the method 900 begins at step 902, where the computing device 102—in response to detecting that a first condition is satisfied—transitions from operating in a lowest-power sleep state to a higher-power sleep state. According to some embodiments, the first condition can be satisfied when an event that was scheduled by the computing device 102 is triggered (e.g., as described in detail herein). Additionally, the first condition can be satisfied when the computing device is plugged into a power source. In particular, the computing device 102 can be configured to elevate into a higher-power sleep state, as it is practical for the computing device 102 to utilize the power source to provide a higher level of performance to its user while the computing device 102 remains plugged into the power source.

At step 904, the computing device 102, in response to detecting that a second condition is satisfied while operating in the higher-power sleep state: causes at least one application of the plurality of applications to carry out at least one respective action. According to some embodiments, the second condition can be satisfied when an indication is received from a second computing device 102 that is associated with the computing device 102. In particular, the second computing device 102 can be configured to analyze tasks that indicate the user likely will utilize the computing device 102. For example, the second computing device 102 can analyze behavior to identify that, when a photo is taken on the second computing device 102, the user typically accesses the computing device 102 shortly thereafter to view/edit the photo (e.g., when the computing device 102 is a laptop and the second computing device 102 is a smartphone). In another example, the second computing device 102 can analyze behavior to identify that, when an email being drafted on the second computing device 102 surpasses a particular word count, the user typically accesses the computing device 102 shortly thereafter to complete the email on a larger keyboard (e.g., when the computing device 102 is a laptop and the second computing device 102 is a smartphone). It is noted that the foregoing scenarios are merely exemplary, and that the second computing device 102 can be configured to analyze any behavior, at any level of granularity, without departing from the scope of this disclosure.

Accordingly, it is noted that the indication received from the second computing device 102 can also specify the at least one application of the plurality of applications. Continuing with the photo example described above, this can involve the second computing device 102 indicating a name, identifier, etc., of the photo application, so that the computing device 102 is able to identify a counterpart photo application to spool-up on the computing device 102 when the computing device 102 transitions into the higher-power sleep state. Additionally, it is noted that the indication received from the second computing device 102 can further-specify an indication of the at least one respective action. Continuing with the photo example described above, this can involve the second computing device 102 indicating a particular task—e.g., download all new photos, download a specific photo, etc.—that the counterpart photo application should perform. In this regard, when the computing device 102 ultimately transitions into an awake state—e.g., when the user powers-on the computing device 102—the counterpart photo application is pre-loaded and refreshed.

It is noted that the above-described indication does not necessarily need to specify the at least one application/the at least one respective action. On the contrary, the computing device 102 can be configured to carry out different refresh operations whose intensity levels scale with the sleep state into which the computing device 102 is transitioning. For example, when a short distance between the computing device 102 and the second computing device 102 causes the computing device 102 to elevate into a highest-power sleep state, the computing device 102 can be configured to refresh all applications that were executing on the computing device 102 prior to entering into a lower-power sleep state. In another example, when a medium distance between the computing device 102 and the second computing device 102 causes the computing device 102 to elevate into a higher-power sleep state that is less than the highest-power sleep state, the computing device 102 can be configured to refresh only a subset of the applications that were executing on the computing device 102 prior to entering into a lower-power sleep state. It is noted that the computing device 102 can perform the refresh operations at any level of granularity without departing from the scope of this disclosure. For example, the computing device 102 can be configured to refresh all applications that were executing on the computing device 102 prior to entering into a lower-power sleep state, but only perform a minimal refresh. For example, when an email application is included in the applications, the minimal refresh can involve only synchronizing an inbox folder and a drafts folder, as opposed to all folders with a full refresh.

Additionally, the second condition of step 904 can be satisfied when the computing device 102 detects a presence of a user who might not be in possession of the second computing device 102. In particular, and as previously described herein, the computing device 102 can detect the presence of the user based on one or more of: sonar, radar, detected motion of the computing device 102 itself, voice identification, and so on. According to some embodiments, any of the foregoing user-presence detections can be analyzed by the computing device 102 to determine the at least one application/the at least one respective action. For example, when the user permits the computing device 102 to perform voice analysis, the computing device 102 can attempt to identify words—e.g., configurable trigger words/phrases—that are spoken by the user and suggest applications that the user potentially will imminently utilize on the computing device 102. For example, when the word "email" is detected—e.g., when the user speaks "I need to check my email"—the computing device 102 can be configured to spool-up the email application, and refresh the folders managed by the email application. In another example, when the word "photo" is detected—e.g., when the user speaks "I can show you the photo on my computer"—the computing device 102 can be configured to spool-up the photo application and download the latest photos from a cloud service.

It is noted that the foregoing scenarios are exemplary, and that any of the information including sonar, radar, detected motion, voice identification, etc.—can be analyzed at any level of granularity to identify applications/tasks that should be identified by the computing device 102 when activating higher-power sleep states. For example, the computing device 102 can be configured to detect common phrases such as "let me grab my laptop," "I'm looking for my laptop," "I'll have to check on my computer," and so on, and identify them as conditions to elevate the computing device 102 into a higher-level sleep state. The computing device 102 can also assign timeout values to particular phrases—e.g., based on calculated reliability values associated with the phrases—that cause the computing device 102 to transition back into a lower-power sleep state when the computing device 102 is not woken by the user.

As described above, one aspect of the present technology is the gathering and use of data available from various sources to improve the overall accuracy by which the computing device enters into and exits out of various sleep states. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to increase the manner in which the computing device adapts itself to the habits of the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of analysis of user behavior, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, general behavior can be inferred based on non-personal information data or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing a plurality of applications on a computing device in accordance with sleep states under which the computing device is operating, the method comprising, at the computing device:
   detecting, at a first rate that correlates to the lowest-power sleep state, whether a first condition is satisfied;
   in conjunction with detecting that the first condition is satisfied, causing the computing device to transition from operating in a lowest-power sleep state to a higher-power sleep state having a level of power that is based circumstances under which the first condition is satisfied;
   detecting, at a second rate that correlates to the higher-power sleep state, whether a second condition is satisfied, wherein the second rate is distinct from the first rate; and
   in conjunction with detecting that the second condition is satisfied:
     causing at least one application of the plurality of applications to carry out at least one respective action at an operational level that is scaled in accordance with the level of power.

2. The method of claim 1, wherein the first condition is satisfied when:
   an event that was scheduled by the computing device is triggered, and/or
   the computing device is plugged into a power source.

3. The method of claim 1, wherein:
   the second condition is satisfied when an indication is received from a second computing device that is associated with the computing device,
   the indication specifies the at least one application of the plurality of applications, and
   the indication specifies the at least one respective action.

4. The method of claim 3, further comprising:
   calculating a distance between the computing device and the second computing device; and
   scaling the operational level of the at least one respective action based on the distance.

5. The method of claim 1, wherein the second condition is satisfied when the computing device detects a presence of a user based on one or more of:
   sonar output by the computing device,
   radar output by the computing device, detected motion of the computing device itself, or
   voice identification.

6. The method of claim 5, wherein, when the computing device detects the presence of the user based on voice identification, the at least one application and the at least one respective action are selected based on the voice identification.

7. The method of claim 1, wherein the plurality of applications were previously executing on the computing device prior to transitioning into the lowest-power sleep state.

8. A non-transitory computer readable storage medium configured to store instructions that, when executed by a processor included in a computing device, cause the computing device to manage a plurality of applications in accordance with sleep states under which the computing device is operating, by carrying out steps that include:
- detecting, at a first rate that correlates to the lowest-power sleep state, whether a first condition is satisfied;
- in conjunction with detecting that the first condition is satisfied, causing the computing device to transition from operating in a lowest-power sleep state to a higher-power sleep state having a level of power that is based circumstances under which the first condition is satisfied;
- detecting, at a second rate that correlates to the higher-power sleep state, whether a second condition is satisfied, wherein the second rate is distinct from the first rate; and
- in conjunction with detecting that the second condition is satisfied:
  - causing at least one application of the plurality of applications to carry out at least one respective action at an operational level that is scaled in accordance with the level of power.

9. The non-transitory computer readable storage medium of claim 8, wherein the first condition is satisfied when:
- an event that was scheduled by the computing device is triggered, and/or the computing device is plugged into a power source.

10. The non-transitory computer readable storage medium of claim 8, wherein:
- the second condition is satisfied when an indication is received from a second computing device that is associated with the computing device,
- the indication specifies the at least one application of the plurality of applications, and
- the indication specifies the at least one respective action.

11. The non-transitory computer readable storage medium of claim 10, wherein the steps further include:
- calculating a distance between the computing device and the second computing device; and
- scaling the operational level of the at least one respective action based on the distance.

12. The non-transitory computer readable storage medium of claim 8, wherein the second condition is satisfied when the computing device detects a presence of a user based on one or more of: sonar output by the computing device, radar output by the computing device, detected motion of the computing device itself, or voice identification.

13. The non-transitory computer readable storage medium of claim 12, wherein, when the computing device detects the presence of the user based on voice identification, the at least one application and the at least one respective action are selected based on the voice identification.

14. The non-transitory computer readable storage medium of claim 8, wherein the plurality of applications were previously executing on the computing device prior to transitioning into the lowest-power sleep state.

15. A computing device configured to manage a plurality of applications in accordance with sleep states under which the computing device is operating, the computing device comprising a processor configured to cause the computing device to carry out steps that include:
- detecting, at a first rate that correlates to the lowest-power sleep state, whether a first condition is satisfied;
- in conjunction with detecting that the first condition is satisfied, causing the computing device to transition from operating in a lowest-power sleep state to a higher-power sleep state having a level of power that is based circumstances under which the first condition is satisfied;
- detecting, at a second rate that correlates to the higher-power sleep state, whether a second condition is satisfied, wherein the second rate is distinct from the first rate; and
- in conjunction with detecting that the second condition is satisfied:
  - causing at least one application of the plurality of applications to carry out at least one respective action at an operational level that is scaled in accordance with the level of power.

16. The computing device of claim 15, wherein the first condition is satisfied when:
- an event that was scheduled by the computing device is triggered, and/or
- the computing device is plugged into a power source.

17. The computing device of claim 15, wherein:
- the second condition is satisfied when an indication is received from a second computing device that is associated with the computing device,
- the indication specifies the at least one application of the plurality of applications, and
- the indication specifies the at least one respective action.

18. The computing device of claim 17, wherein the steps further include:
- calculating a distance between the computing device and the second computing device; and
- scaling the operational level of the at least one respective action based on the distance.

19. The computing device of claim 15, wherein the second condition is satisfied when the computing device detects a presence of a user based on one or more of: sonar output by the computing device, radar output by the computing device, detected motion of the computing device itself, or voice identification.

20. The computing device of claim 19, wherein, when the computing device detects the presence of the user based on voice identification, the at least one application and the at least one respective action are selected based on the voice identification.

* * * * *